US011403297B2

(12) United States Patent
Gawande et al.

(10) Patent No.: US 11,403,297 B2
(45) Date of Patent: *Aug. 2, 2022

(54) SELECTING RESOURCE CONFIGURATIONS FOR QUERY EXECUTION

(71) Applicant: Amazon Technologies, Inc., Seattle, WA (US)

(72) Inventors: Pratik Bhagwat Gawande, Seattle, WA (US); Sumeetkumar Veniklal Maru, Redmond, WA (US); Bhargava Ram Kalathuru, Seattle, WA (US); Jian Fang, Sammamish, WA (US); Xing Wu, Redmond, WA (US); Yuanyuan Yue, Bellevue, WA (US); Turkay Mert Hocanin, New York, NY (US); Jason Douglas Denton, Seattle, WA (US); Luca Natali, Kenmore, WA (US); Rahul Sharma Pathak, Seattle, WA (US); Abhishek Rajnikant Sinha, Redmond, WA (US); Armen Tangamyan, Bellevue, WA (US); Yufeng Jiang, Sammamish, WA (US); Marc Howard Beitchman, Seattle, WA (US); Andrew Edward Caldwell, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/839,849

(22) Filed: Apr. 3, 2020

(65) Prior Publication Data

US 2020/0233869 A1 Jul. 23, 2020

Related U.S. Application Data

(63) Continuation of application No. 15/470,843, filed on Mar. 27, 2017, now Pat. No. 10,614,066.

(Continued)

(51) Int. Cl.
*G06F 16/20* (2019.01)
*G06F 16/21* (2019.01)
(Continued)

(52) U.S. Cl.
CPC .......... *G06F 16/24545* (2019.01); *G06F 9/50* (2013.01); *G06F 9/505* (2013.01);
(Continued)

(58) Field of Classification Search
CPC .... G06F 16/24545; G06F 16/20; G06F 16/25; G06F 16/27; G06F 16/90335;
(Continued)

(56) References Cited

U.S. PATENT DOCUMENTS 6,314,447 B1 11/2001 Lea et al.
6,366,915 B1 4/2002 Rubert et al.
(Continued)

FOREIGN PATENT DOCUMENTS

EP 2778967 9/2014
JP 2012058815 3/2012
(Continued)

OTHER PUBLICATIONS

Anonymous, "optimization—Are SQL Execution Plans based on Schema or Data or both?", Stack Overflow.com, Retrieved from the Internet: URL:https://web.archive.org/web/20160708184640/https:// stackoverflow.com/questions/4787205/are-sql-execution-plans-based-onschema-or-data-or-both, Jul. 8, 2016.

*Primary Examiner* — Jorge A Casanova
(74) *Attorney, Agent, or Firm* — Robert C. Kowert; Kowert, Hood, Munyon, Rankin & Goetzel, P.C.

(57) ABSTRACT

The configuration of computing resources for executing queries may be selected. A comparison of the configuration of computing resources that executed previous queries may be made to select the configuration of computing resources
(Continued)

for a received query. A historical query execution model maybe applied, in some embodiments, to determine a resource configuration for computing resources to execute a query. The computing resources may be selected from available computing resources according to the determined resource configuration.

20 Claims, 15 Drawing Sheets

Related U.S. Application Data

(60) Provisional application No. 62/382,477, filed on Sep. 1, 2016.

(51) Int. Cl.
| | | |
|---|---|---|
| *G06F 16/245* | (2019.01) | |
| *G06F 16/2453* | (2019.01) | |
| *G06F 16/2455* | (2019.01) | |
| *G06F 16/2458* | (2019.01) | |
| *G06F 16/248* | (2019.01) | |
| *G06F 16/28* | (2019.01) | |
| *G06F 16/903* | (2019.01) | |
| *G06F 9/50* | (2006.01) | |
| *G06F 16/27* | (2019.01) | |
| *G06F 16/25* | (2019.01) | |
| *H04L 67/1008* | (2022.01) | |
| *H04L 67/1029* | (2022.01) | |
| *H04L 67/10* | (2022.01) | |
| *H04L 67/1031* | (2022.01) | |

(52) U.S. Cl.
CPC .......... *G06F 9/5022* (2013.01); *G06F 9/5044* (2013.01); *G06F 9/5055* (2013.01); *G06F 9/5061* (2013.01); *G06F 9/5088* (2013.01); *G06F 16/20* (2019.01); *G06F 16/211* (2019.01); *G06F 16/248* (2019.01); *G06F 16/2455* (2019.01); *G06F 16/2471* (2019.01); *G06F 16/24549* (2019.01); *G06F 16/24553* (2019.01); *G06F 16/25* (2019.01); *G06F 16/27* (2019.01); *G06F 16/282* (2019.01); *G06F 16/90335* (2019.01); *H04L 29/0827* (2013.01); *H04L 29/08135* (2013.01); *H04L 29/08171* (2013.01); *H04L 29/08261* (2013.01); *H04L 67/10* (2013.01); *H04L 67/1008* (2013.01); *H04L 67/1029* (2013.01); *H04L 67/1031* (2013.01); *G06F 9/5027* (2013.01); *G06F 16/245* (2019.01); *G06F 2209/501* (2013.01); *G06F 2209/503* (2013.01); *G06F 2209/508* (2013.01); *G06F 2209/5011* (2013.01)

(58) Field of Classification Search
CPC ......... G06F 16/24549; G06F 16/24553; G06F 16/211; G06F 16/2471; G06F 16/2455; G06F 16/282; G06F 16/248; G06F 9/5061; G06F 9/5022; G06F 9/5088; G06F 9/5055; G06F 9/505; G06F 9/5044; G06F 16/245; G06F 2209/508; G06F 2209/5011; G06F 9/5027; G06F 2209/501; G06F 2209/50; H04L 29/08171; H04L 29/08261; H04L 29/0827; H04L 29/08135
See application file for complete search history.

(56) References Cited

U.S. PATENT DOCUMENTS

| | | |
|---|---|---|
| 6,473,750 B1 | 10/2002 | Petculescu et al. |
| 6,859,926 B1 | 2/2005 | Brenner et al. |
| 7,243,093 B2 | 7/2007 | Cragun et al. |
| 7,406,461 B1 | 7/2008 | Chapman et al. |
| 8,429,096 B1 | 4/2013 | Soundararajan et al. |
| 8,782,075 B2 | 7/2014 | Zane et al. |
| 9,208,032 B1 | 12/2015 | McAlister et al. |
| 10,614,066 B2 | 4/2020 | Gawande et al. |
| 10,762,086 B2 | 9/2020 | Wu et al. |
| 2004/0205759 A1 | 10/2004 | Oka |
| 2008/0201459 A1 | 8/2008 | Vul et al. |
| 2010/0094862 A1 | 4/2010 | Bent et al. |
| 2010/0094892 A1 | 4/2010 | Bent et al. |
| 2012/0179644 A1 | 7/2012 | Miranker |
| 2013/0024442 A1 | 1/2013 | Santosuosso et al. |
| 2013/0160014 A1 | 6/2013 | Watanabe et al. |
| 2013/0262638 A1 | 10/2013 | Kumarasamy |
| 2014/0032535 A1 | 1/2014 | Singla |
| 2014/0074540 A1 | 3/2014 | Evans et al. |
| 2014/0149355 A1 | 5/2014 | Gupta et al. |
| 2014/0156632 A1 | 6/2014 | Yu et al. |
| 2014/0229221 A1 | 8/2014 | Shih et al. |
| 2014/0280076 A1 | 9/2014 | Sumizawa |
| 2015/0040180 A1 | 2/2015 | Jacobson et al. |
| 2015/0149501 A1 | 5/2015 | Prakash et al. |
| 2015/0234922 A1 | 8/2015 | Dageville et al. |
| 2016/0373478 A1 | 12/2016 | Doubleday |
| 2017/0316078 A1 | 11/2017 | Funke et al. |
| 2018/0039674 A1 | 2/2018 | Seyvet et al. |
| 2018/0060393 A1 | 3/2018 | Kalathuru et al. |
| 2018/0088566 A1 | 3/2018 | Billi-Duran et al. |

FOREIGN PATENT DOCUMENTS

| | | |
|---|---|---|
| JP | 2015529366 | 10/2015 |
| WO | 2014039919 | 3/2014 |

SELECTING RESOURCE CONFIGURATIONS FOR QUERY EXECUTION

RELATED APPLICATIONS

This application is a continuation of U.S. patent application Ser. No. 15/470,843, filed Mar. 27, 2017, which claims benefit of priority to U.S. Provisional Application Ser. No. 62/382,477, file Sep. 1, 2016, and which are incorporated herein by reference in their entirety.

BACKGROUND

Computing systems for querying of large sets of data can be extremely difficult to implement and maintain. In many scenarios, for example, it is necessary to first create and configure the infrastructure (e.g. server computers, storage devices, networking devices, etc.) to be used for the querying operations. It might then be necessary to perform extract, transform, and load ("ETL") operations to obtain data from a source system and place the data in data storage. It can also be complex and time consuming to install, configure, and maintain the database management system ("DBMS") that performs the query operations. Moreover, many DBMS are not suitable for querying extremely large data sets in a performant manner.

Computing clusters can be utilized in some scenarios to query large data sets in a performant manner. For instance, a computing cluster can have many nodes that each execute a distributed query framework for performing distributed querying of a large data set. Such computing clusters and distributed query frameworks are, however, also difficult to implement, configure, and maintain. Moreover, incorrect configuration and/or use of computing clusters such as these can result in the non-optimal utilization of processor, storage, network and, potentially, other types of computing resources.

The disclosure made herein is presented with respect to these and other considerations.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Figure 1:
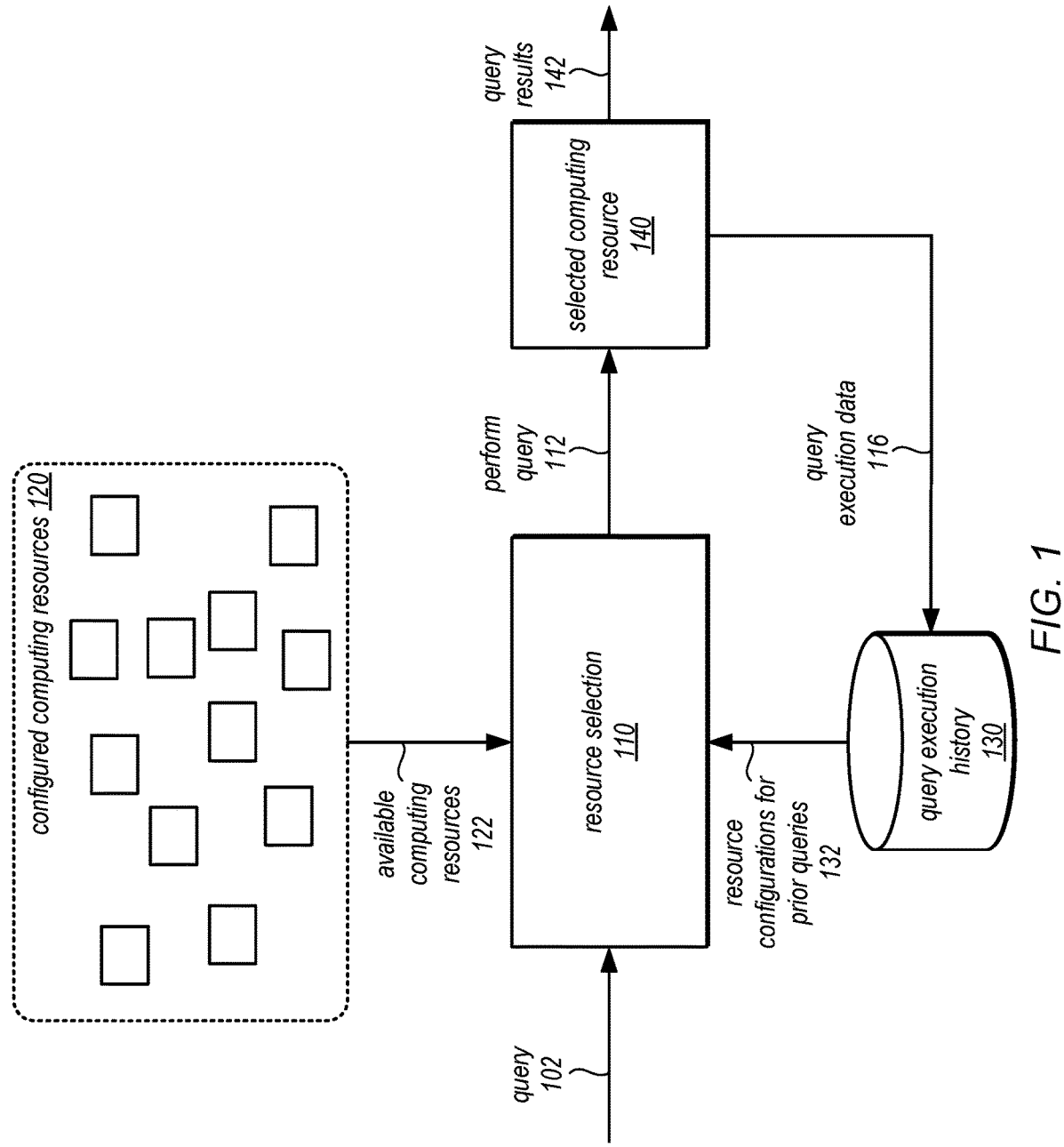
FIG. 1 illustrates a data flow diagram for selecting resource configurations for query execution, according to some embodiments.

Various embodiments of selecting resource configurations for query execution are described herein. FIG. 1 illustrates a data flow diagram for selecting resource configurations for query execution, according to some embodiments. Configured computing resources 120 may be instantiated, configured, and otherwise prepared for executing different types of queries, such as query 102, in some embodiments. For example, configured computing resources may be one or more nodes, instances, hosts, or other collections of computing resources (e.g., a cluster of computing resources) that implement a query engine (e.g., a distributed query processing engine or framework) for executing queries with respect to data sets (e.g., that may be remotely stored), in one embodiment. Computing resources 120 may be differently configured, in at least some embodiments, providing opportunities to offer different execution performance for queries. As different queries may be executed to provide different types of performance, resource selection 110 may be implemented to intelligently route queries to resources that are likely to provide a desired performance for executing the queries, in various embodiments. Moreover, as different types of performance characteristics for queries may be achieved using different configurations of computing resources, query execution can be optimized on behalf of a client that submitted the query or a service that manages the resources for executing queries, so that efficient utilization of resources can be achieved, in some embodiments.

For example, as illustrated in FIG. 1, resource selection 110 may receive a query 102. In order to select a resource for query 102, resource selection 110 may obtain available computing resources 122 (e.g., those computing resources not executing another query) and resource configurations for the execution of prior queries 132 from query execution history 130. Based on the performance of prior queries on the resource configurations, an available computing resource 122 can be selected that provides a similar configuration to one of the prior configurations to execute query 102. For example, if query 102 is to be executed within an execution limit (e.g., for execution time or execution cost), then the resource configurations that executed prior queries that achieved times or costs with the execution limitation may be considered. As discussed below with regard to FIGS. 7, and 9-11, various kinds of models based on machine learning or other statistical analysis may be implemented to compare query 102 with the execution performance of prior queries and prior resource configurations. For example, a feature set or other information about query 102 may be determined form query 102 and used to compare query 102 to the prior execution of other queries.

A resource may be selected, as indicated at 140, that satisfies the execution limitation (e.g., a resource selection goal), and may be instructed to perform the query 112. For example, selected computing resource 140 may implement a cluster of nodes that apply a SQL query to one or multiple data sets stored in one or multiple locations in order to generate query results 142. In addition to generating query results 142, query execution data 116 may be collected and stored as part of query execution history 130, in order to update the resource selection data available for analysis at resource selection 110 with further examples of resource configuration mapped to a performance outcome for a query, as discussed below with regard to FIGS. 7 and 10.

Please note that the previous description of selecting resource configurations for query execution is a logical illustration and thus is not to be construed as limiting as to the implementation of resource selection, computing resources, or query execution history.

This specification begins with a general description of a provider network that implements a resource management service that selecting resource configurations for query execution that are queries received from another network-based service, a managed query service. Then various examples of the managed query service and resource management service (along with other services that may be utilized or implemented) including different components/modules, or arrangements of components/module that may be employed as part of implementing the services are discussed. A number of different methods and techniques to implement selecting resource configurations for query execution are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
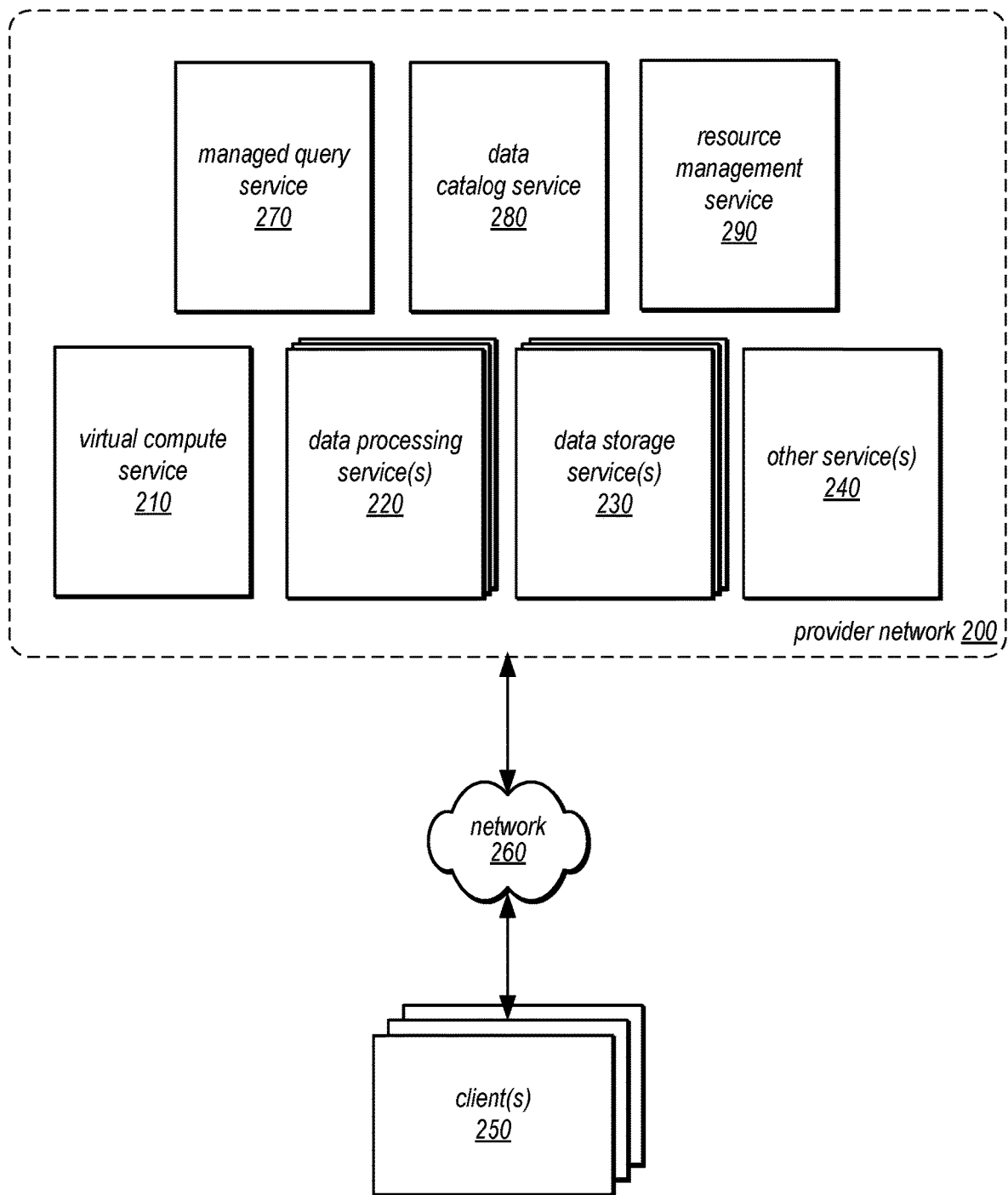
FIG. 2 is a logical block diagram illustrating a provider network offering a managed query service that selects resource configurations for executing queries, according to some embodiments.

FIG. 2 is a logical block diagram illustrating a provider network offering a managed query service that selects resource configurations for executing queries, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., FIGS. 13, 14 and computing system 2000 described below with regard to FIG. 15), needed to implement and distribute the infrastructure and storage services offered by the provider network 200. In some embodiments, provider network 200 may implement various computing resources or services, such as a virtual compute service 210, data processing service(s) 220, (e.g., relational or non-relational (NoSQL) database query engines, map reduce processing, data flow processing, and/or other large scale data processing techniques), data storage service(s) 230, (e.g., an object storage service, block-based storage service, or data storage service that may store different types of data for centralized access) other services 240 (any other type of network based services (which may include various other types of storage, processing, analysis, communication, event handling, visualization, and security services not illustrated), managed query service 270, data catalog service 280, and resource management service 290.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 15 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 202 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. Different configurations of compute instances, as discussed below with regard to FIG. 3, may be implemented as computing resources associated in different pools of resources managed by resource management service 290 for executing jobs routed to the resources, such as queries routed to select resources by managed query service 270.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 220 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230. For example, a data set stored in a non-relational format may be identified along with a container or group in an object-based data store that stores the data set along with other data objects on behalf of a same customer or client of provider network 200. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources or clusters configured to process queries with respect to the data, as discussed below with regard to FIGS. 3-6.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-7, may manage the execution of queries on behalf of clients so that clients may perform queries over data stored in one or multiple locations (e.g., in different data storage services, such as an object store and a database service) without configuring the resources to execute the queries, in various embodiments. Resource management service 290, as discussed in more detail below, may manage and provide pools of computing resources for different services like managed query service 270 in order to execute jobs on behalf the different services, as discussed above with regard to FIG. 1.

Generally speaking, clients 250 may encompass any type of client configurable to submit network-based requests to provider network 200 via network 260, including requests for storage services (e.g., a request to create, read, write, obtain, or modify data in data storage service(s) 240, etc.) or managed query service 270 (e.g., a request to query data in a data set stored in data storage service(s) 230). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 250 and the operating system or file system on behalf of applications executing within the operating system environment.

Clients 250 may convey network-based services requests (e.g., access requests directed to data in data storage service(s) 240, operations, tasks, or jobs, being performed as part of data processing service(s) 230, or to interact with data catalog service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
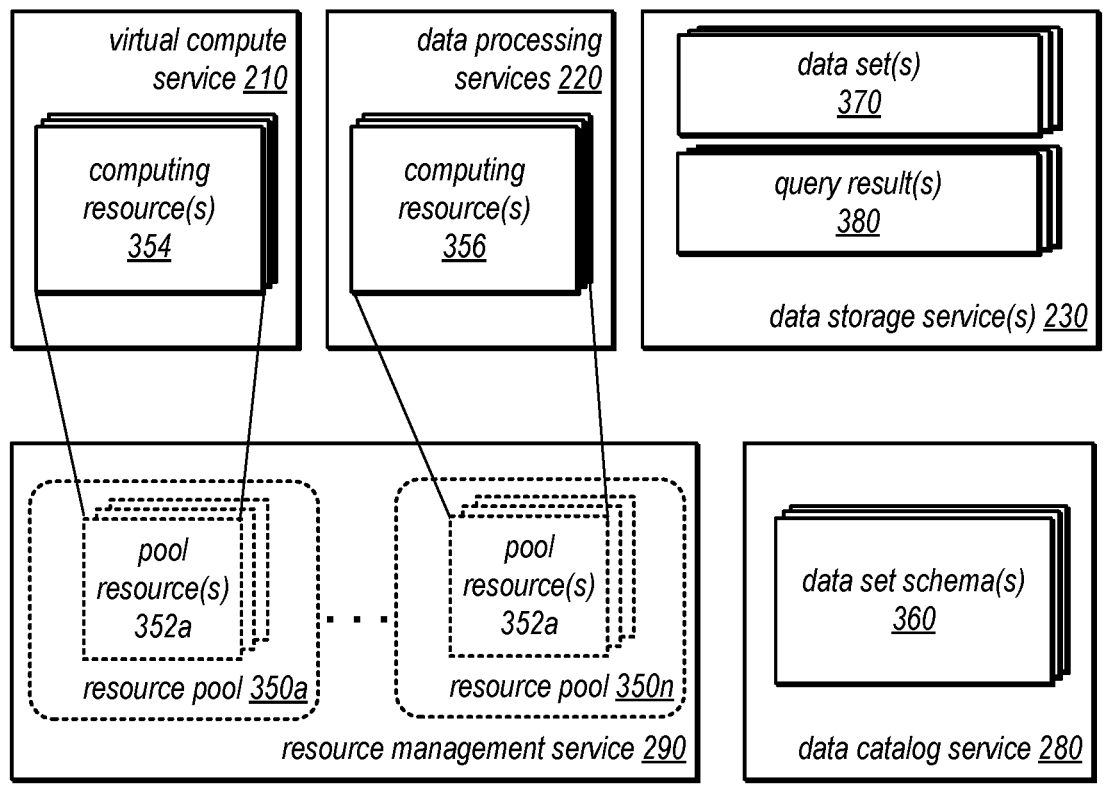
FIG. 3 is a logical block diagram illustrating a managed query service, according to some embodiments.
Figure 3:
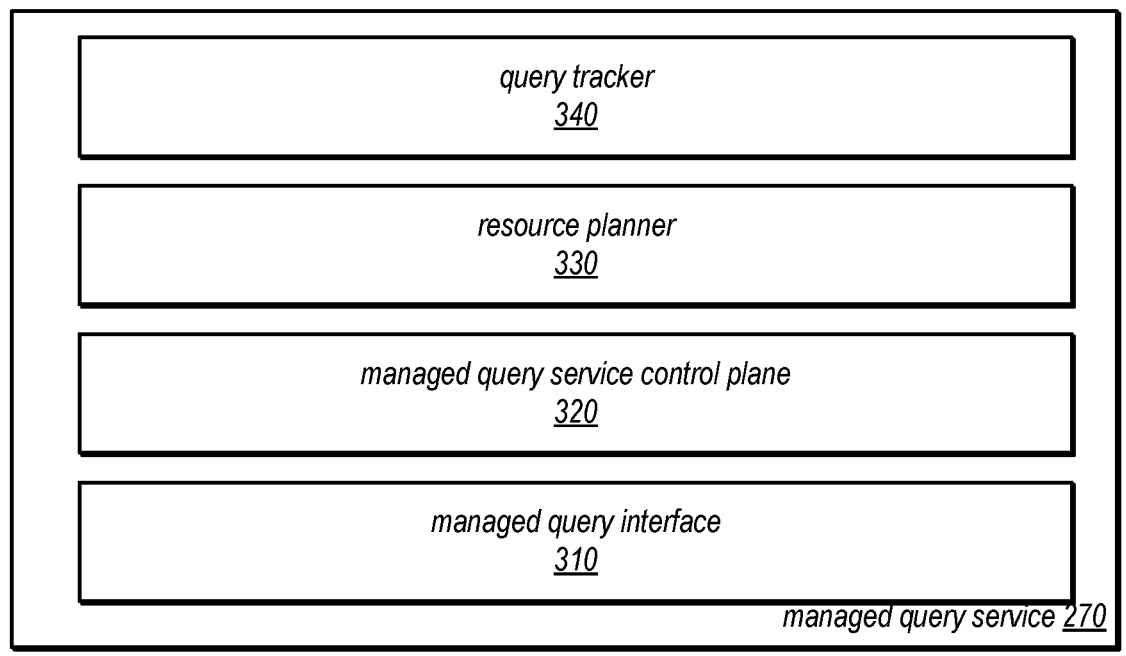

FIG. 3 is a logical block diagram illustrating a managed query service, according to some embodiments. As discussed below with regard to FIGS. 4-9, managed query service 270 may leverage the capabilities of various other services in provider network 200. For example, managed query service 270 may utilize resource management service 290 to provision and manage pools of preconfigured resources to execute queries, provide resources of preconfigured queries, and return utilized resources to availability. For example, resource management service 290 may instantiate, configure, and provide resource pool(s) 350a and 350n that include pool resource(s) 352a and 352n from one or more different resource services, such as computing resource(s) 354 in virtual compute service 210 and computing resource(s) 356 in data processing service(s) 220. Resource management service 290 may send requests to create, configure, tag (or otherwise associate) resources 352 for a particular resource pool, terminate, reboot, otherwise operate resources 352 in order to execute jobs on behalf of other network-based services.

Once a resource from a pool is provided (e.g., by receiving an identifier or other indicator of the resource to utilize), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 352, as discussed below with regard to FIG. 4, for subsequent use when processing queries, as discussed below with regard to FIGS. 5-7, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, resource planner workers for resource planner 330, or query tracker monitors for query tracker 340). Managed query service control plane 320 may direct requests to appropriate components as discussed below with regard to FIGS. 5 and 6. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s) 230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

Managed query service 270 may implement resource planner 330 to intelligently select available computing resources from pools for execution of queries, in some embodiments, as discussed in more detail below with regard to FIG. 7. For example, resource planner 330 may evaluated collected data statistics associated with query execution (e.g., reported by computing resources) and determine an estimated number or configuration of computing resources for executing a query within some set of parameters (e.g., cost, time, etc.). For example, machine learning techniques may be applied by resource planner 330 to generate a query estimation model that can be applied to the features of a received query to determine the number/configuration of resources, in one embodiment. Resource planner 330 may then provide or identify which ones of the resources available to execute the query from a pool that may best fit the estimated number/configuration, in one embodiment.

In various embodiments, managed query service 270 may implement query tracker 340 in order to manage the execution of queries at compute clusters, track the status of queries, and obtain the resources for the execution of queries from resource management service 290. For example, query tracker 340 may maintain a database or other set of tracking information based on updates received from different managed query service agents implemented on provisioned computing resources (e.g., computing clusters as discussed below with regard to FIGS. 5-6).

Figure 4:
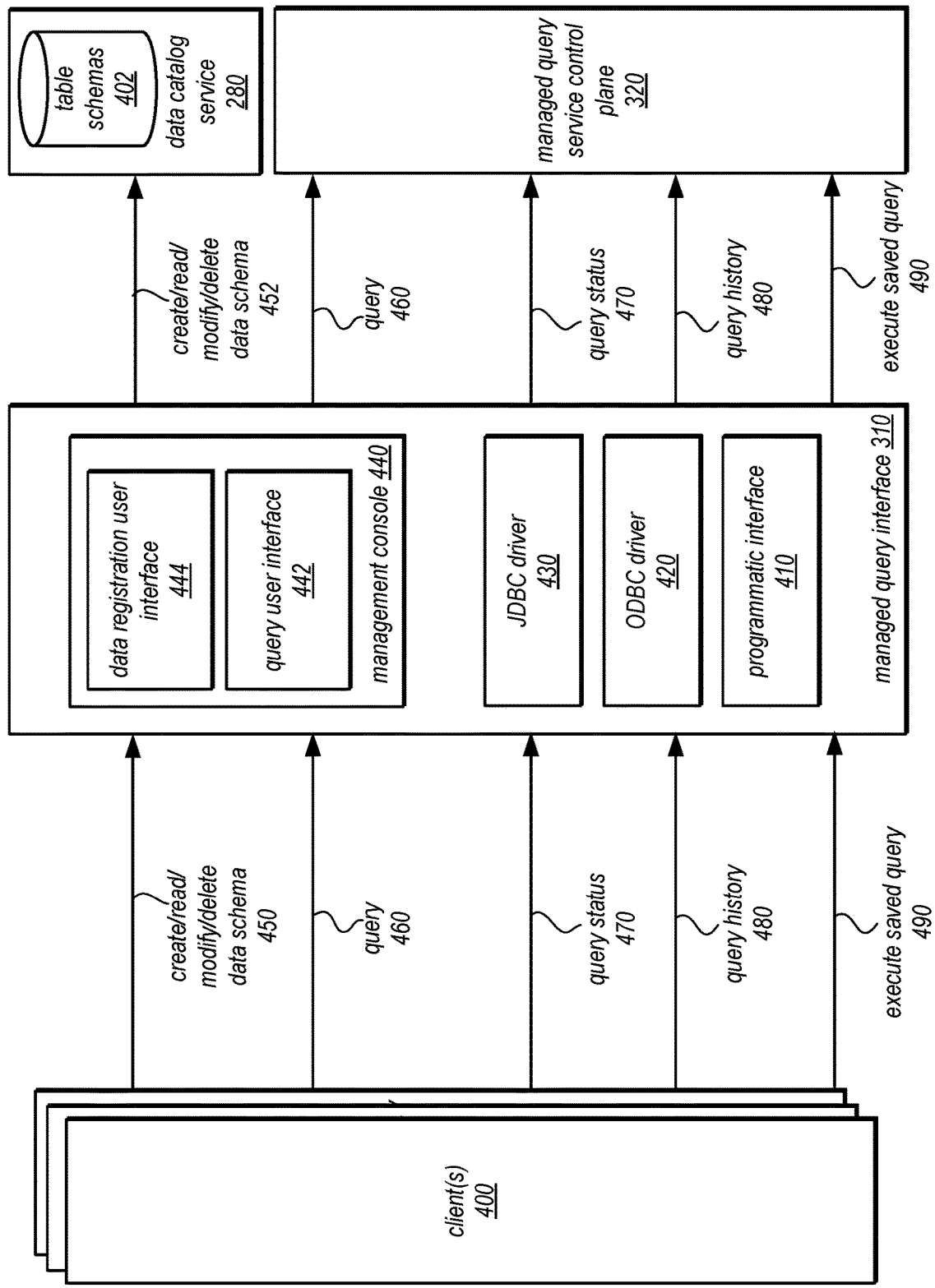
FIG. 4 is a diagram illustrating interactions between clients and managed query service, according to some embodiments.

FIG. 4 is a diagram illustrating interactions between clients and managed query service, according to some embodiments. Client(s) 400 may be client(s) 250 in FIG. 2 above or other clients (e.g., other services systems or components implemented as part of provider network 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provider a user interface to submit queries 442 (e.g., graphical or command line user interfaces) or register data schemas 444 for executing queries. For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of request to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/desrializers), partitions of a data set (e.g., according to time, geographic location, or other dimensions), or any other schema information for process queries with respect to data sets, in various embodiments. In at least some embodiments, request to create/read/modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIGS. 5 and 6. Queries 460 may be formatted according to various types of query languages, such as Structured Query Language (SQL) or HQL.

Client(s) 400 may also submit requests for query history 480 or other account related query information (e.g., favorite or common queries) which managed query. In some embodiments, client(s) 400 may programmatically trigger the performance of past queries by sending a request to execute a saved query 490, which managed query service control plane 320 may look-up and execute. For example, execute saved query request may include a pointer or other identifier to a query stored or saved for a particular user account or client. Managed query service control plane 320 may then access that user query store to retrieve and execute the query (according to techniques discussed below with regard to FIGS. 5-6).

Figure 5:
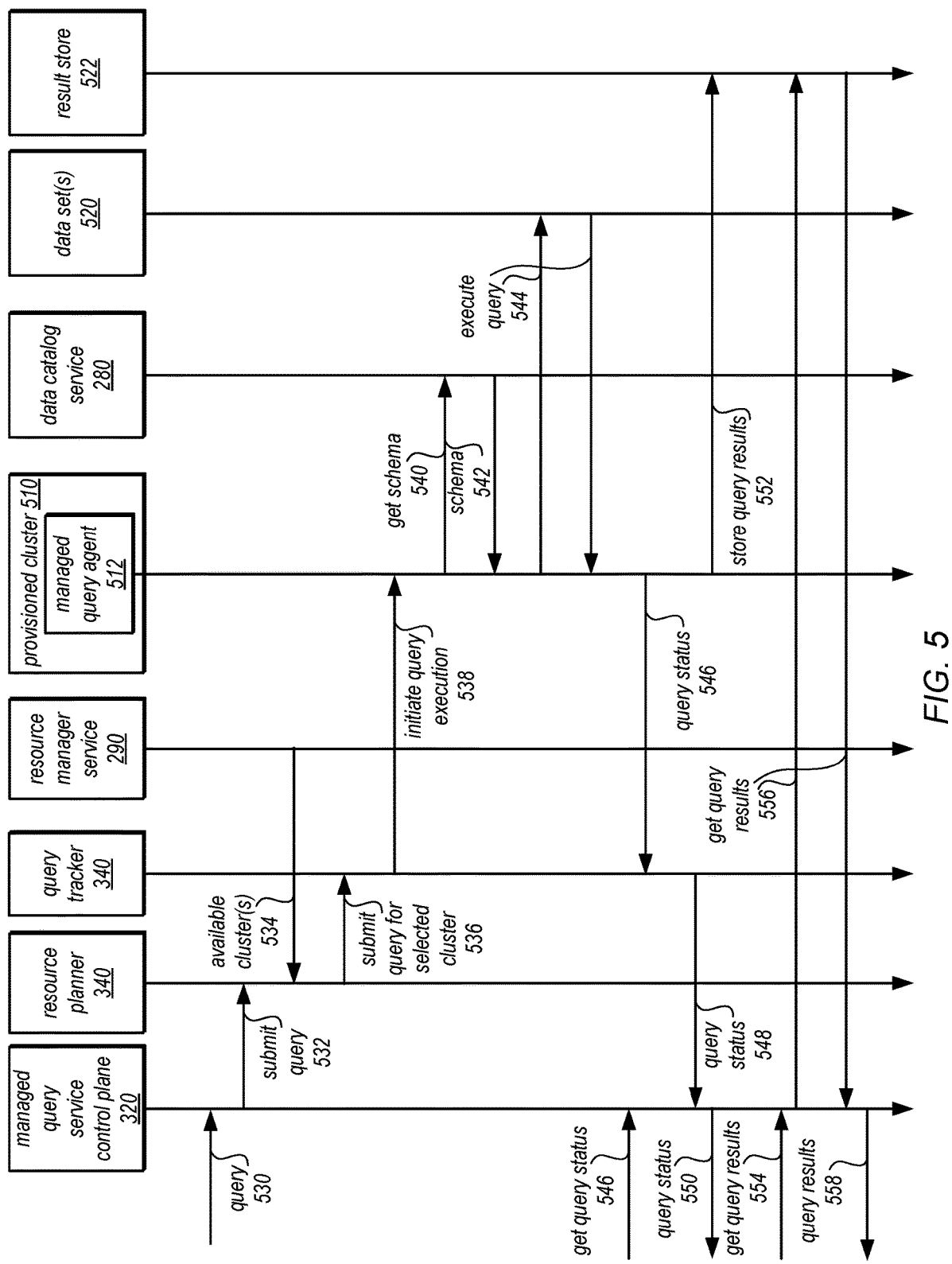
FIG. 5 is a sequence diagram for managed execution of queries utilizing a resource planner, according to some embodiments.
Figure 6:
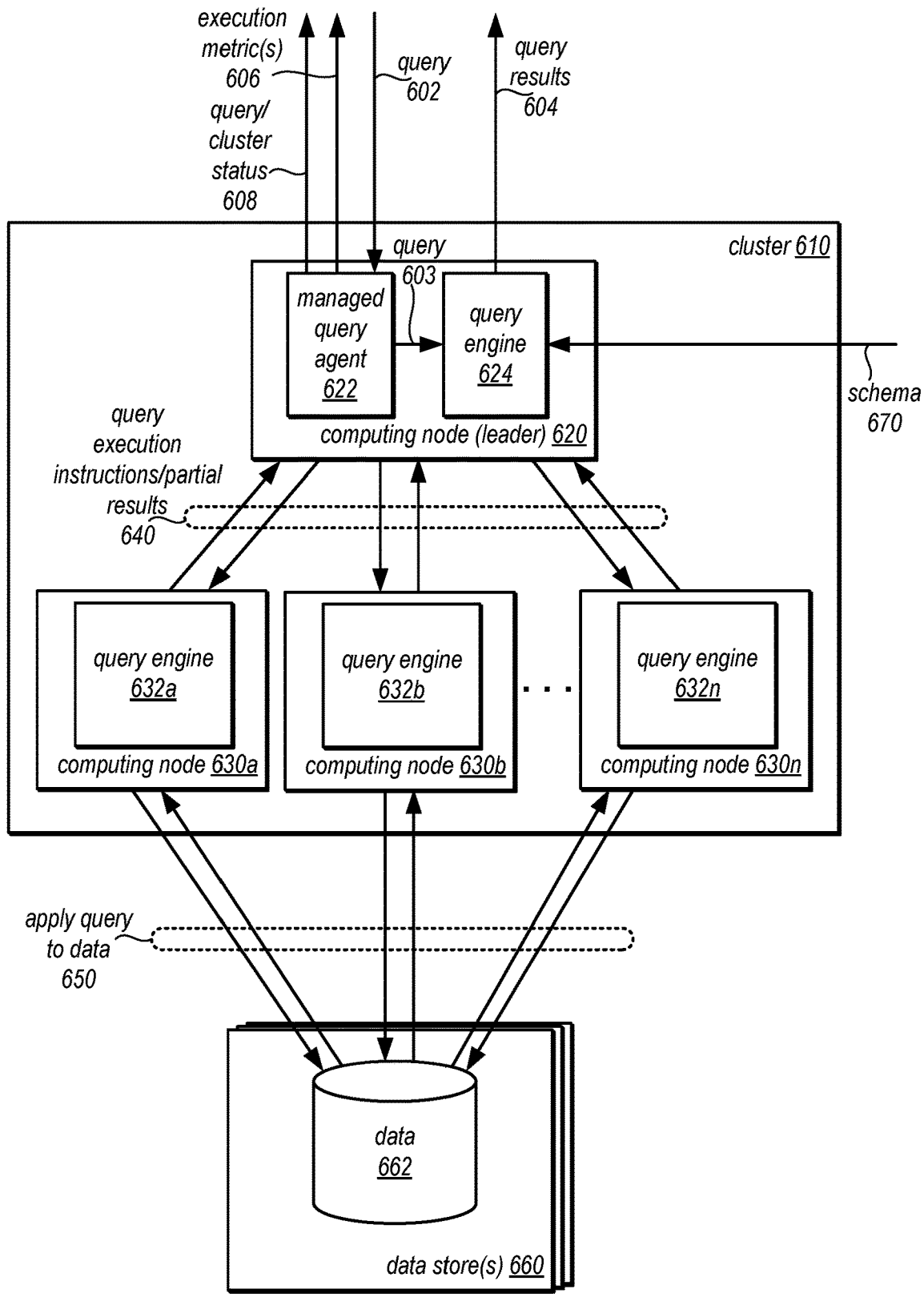
FIG. 6 is a logical block diagram illustrating a cluster processing a query as part of managed query execution, according to some embodiments.

FIG. 5 is a sequence diagram for managed execution of queries utilizing a resource planner, according to some embodiments. Query 530 may be received at managed query service control plane 320 which may submit the query 532 to resource planner 340. Resource planner 340 may analyze the query to determine the optimal cluster to process the query based on historical data for processing queries and available cluster(s) 534 received from resource management service 290. Resource planner 340 may then select a query and submit the query to query tracker 340 indicating the selected cluster 536 for execution. Query tracker 340 may then initiate execution of the query 538 at the provisioned cluster 510, sending a query execution instruction to a managed query agent 512.

Managed query agent 512 may get schema 540 for the data sets(s) 520 from data catalog service 280, which may return the appropriate schema 542. Provisioned cluster 510 can then generate a query execution plan and execute the query 544 with respect to data set(s) 520 according to the query plan. Managed query agent 512 may send query status 546 to query tracker 340 which may report query status 548 in response to get query status 546 request, sending a response 550 indicating the query status 550. Provisioned cluster 510 may store the query results 552 in a result store 522 (which may be a data storage service 230). Managed query service control plane 320 may receive q request to get a query results 554 and get query results 556 from results store 522 and provide the query results 558 in response, in some embodiments.

Different types of computing resources may be provisioned and configured in resource pools, in some embodiments. Single-node clusters or multi-node compute clusters may be one example of a type of computing resource provisioned and configured in resource pools by resource management service 290 to service queries for managed query service 270. FIG. 6 is a logical block diagram illustrating a cluster processing a query as part of managed query execution, according to some embodiments. Cluster 610 may implement a computing node 620 that is a leader node (according to the query engine 624 implemented by cluster 610). In some embodiments, no single node may be a leader node, or the leader node may rotate from processing one query to the next. Managed query agent 622 may be implemented as part of leader node 620 in order to provide an interface between the provisioned resource, cluster 610, and other components of managed query service 270 and resource management service 290. For example, managed query agent 622 may provide further data to managed query service 270, such as the status 608 of the query (e.g. executing, performing I/O, performing aggregation, etc.,) and execution metrics 606 (e.g., health metrics, resource utilization metrics, cost metrics, length of time, etc.). In some embodiments, managed query agent 622 may provide cluster/query status 608 and execution metric(s) 606 to resource management service 290 (in order to make pool management decisions, such as modification events, lease requests, etc.). For example, managed query agent 622 may indicate cluster status 608 to resource management service 290 indicating that a query has completed and that the cluster 610 is ready for reassignment (or other resource lifecycle operations).

Leader node 620 may implement query engine 624 to execute queries, such as query 602 which may be received via managed query agent 622 as query 603. For instance, managed query agent may implement a programmatic interface for query tracker to submit queries (as discussed above in FIGS. 5 and 6), and then generate and send the appropriate query execution instruction to query engine 624. Query engine 624 may generate a query execution plan for received queries 603. In at least some embodiments, leader node 620, may obtain schema information for the data set(s) 670 from the data catalog service 280 or metadata stores for data 662 (e.g., data dictionaries, other metadata stores, other data processing services, such as database systems, that maintain schema information) for data 662, in order to incorporate the schema data into the generation of the query plan and the execution of the query. Leader node 620 may generate and send query execution instructions 640 to computing nodes that access and apply the query to data 662 in data store(s) 660. Compute nodes, such as nodes 630a, 630b, and 630n, may respectively implement query engines 632a, 632b, and 632n to execute the query instructions, apply the query to the data 650, and return partial results 640 to leader node 620, which in turn may generate and send query results 604. Query engine 624 and query engines 632 may implement various kinds of distributed query or data processing frameworks, such as the open source Presto distributed query framework or the Apache Spark framework.

Figure 7:
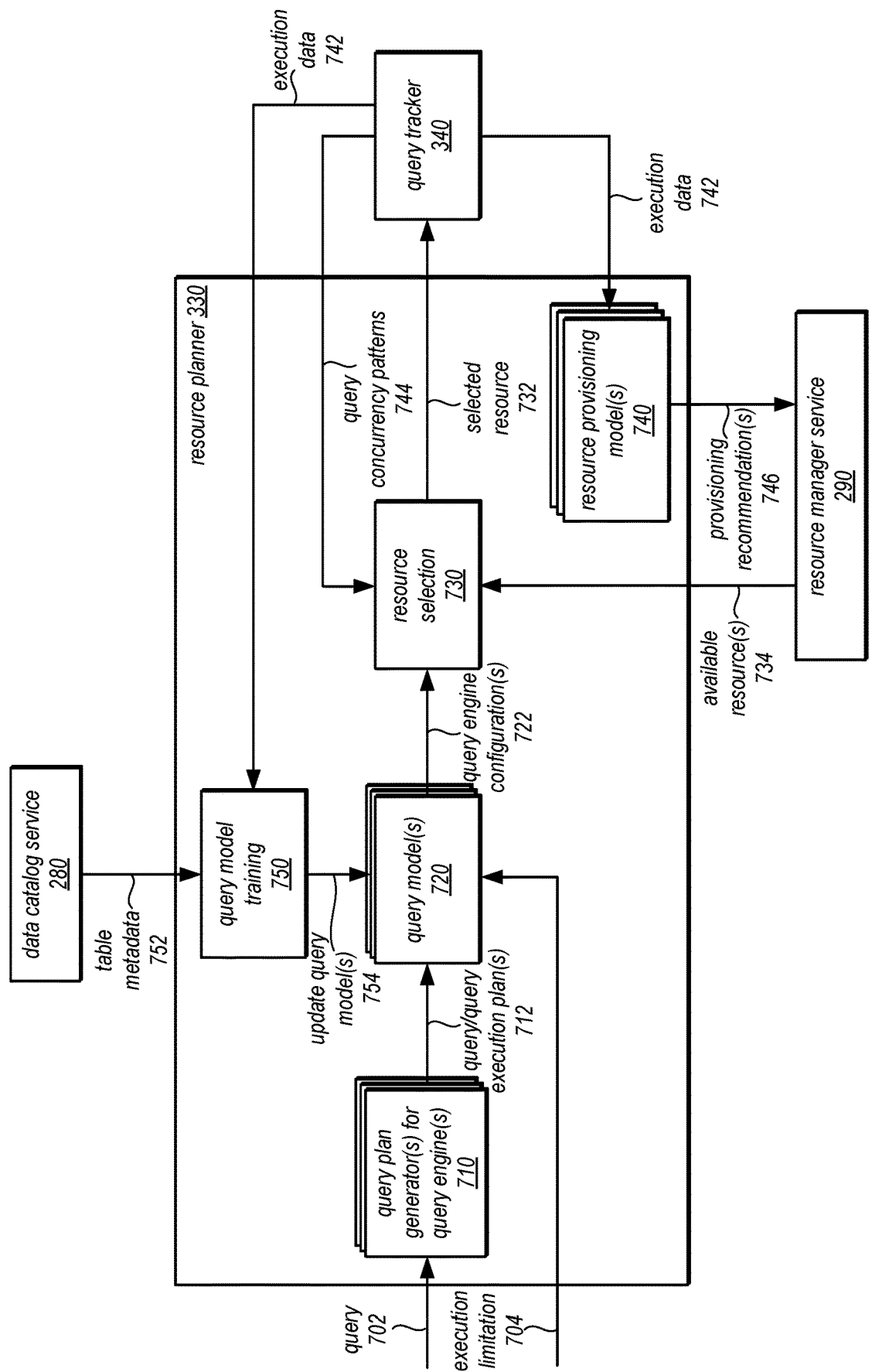
FIG. 7 is a logical block diagram illustrating a resource planner that selects resource configurations for executing queries, according to some embodiments.

FIG. 7 is a logical block diagram illustrating a resource planner that selects resource configurations for executing queries, according to some embodiments. Resource planner 330, as discussed above, may determine or select a resource configuration for the execution of a query. As illustrated in FIG. 7, a query 702 may be received at resource planner 330. Resource planner may implement one or more query model(s) 720 to evaluate the query 702. Query model(s) 720 may be generated using various types of machine learning and other statistical analyses. For example, resource planner 330 may implement query model training 750 to receive information for inclusion in the query model(s) 720 and update the query model(s) 754, providing supervised learning to adjust the model to map different types of queries and resource configurations with different outcomes. In this way, query model(s) 720 can classify or otherwise identify features to be compared with received queries 702 in order to determine a configuration for executing the query according to a received execution limitation 704.

Query model(s) 720 can be generated using many different sources of information. For example, as illustrated in FIG. 7, query model training 750 may include table metadata 752 as part of training and updating query model(s)

720, in some embodiments. Table metadata may include information describing tables or other data evaluated or searched by queries, such as the number of rows in a table, the number of distinct values in a column, the number of null values in a column, the distribution of data values in a column (e.g., according to a histogram), the cardinality of data values in a column, size or number of data blocks in a table, index statistics, and the like. In at least some embodiments, table metadata 752 may be obtained from data catalog service 280 and obtained via API or other requests to data catalog service to receive the table metadata 752.

Query model(s) 720 may also be generated using execution data 742 received from the execution of queries at computing resources of different configurations, in some embodiments. For example, the memory consumed, processing capacity consumed, number of slots, nodes, or other execution units consumed/utilized, execution plans for prior queries (e.g., including the various types of operations selected by the plan to perform the prior queries), the total execution time to perform the query, a resource or determined cost (e.g., in terms of work or cost units, such as IOPS or monetary units), failure or success indications, failure types (e.g., including error codes or exceptions generated).

Updates to query model(s) 754 may be periodically performed (e.g., daily or weekly) or in response to trigger events (e.g., number of queries processed since last update, number of new queries processed since last update, new set of execution data 742 or table metadata 754 received etc.), in some embodiments. Query model training 750 may apply different types of machine learning techniques to generate and update query model(s) 720. For instance, the information related to a prior query (e.g., execution metadata, including the query execution plan, execution costs, etc., and table metadata, including number of rows in access tables) may be used to generate feature vectors that create a feature space for performing comparisons with newly received queries, in one embodiment. Feature extraction or selection techniques may be implemented to determine which data (e.g., what kinds of table metadata or execution data) are more determinative for different performance outcomes for a query in order to adjust the query model(s), in some embodiments. Note that although supervised learning techniques are described above, in some embodiments, query model(s) 720 may be generated using unsupervised learning techniques.

Query model(s) 720 may be applied to received queries in order to determine a resource configuration, such as a query engine configuration for a received query. For example, query 702 may be received at resource planner 330. In some embodiments, resource planner 330 may implement different query plan generator(s) for query engine(s) 710. Different types of query engines may be implemented to execute queries, and thus, plan generators for the different possible query engines may be implemented in order to generate an execution plan for each query engine. For example, a query engine utilizing the Presto framework may generate a different query execution plan than a query engine utilizing the Apache Spark framework. Similarly, different query model(s) 720 may be maintained for the different query engines, in some embodiments. Query plans may include various kinds operations that may be performed to execute a query, such as different types of join operations (e.g., hash joins, distributed joins, etc.), different types of scan operations, aggregation operations, predicate filters, and the like.

The query and query execution plans may be provided 712 and evaluated using query model(s) 720. For example, a feature vector for the query based on the query execution plan and execution limitation 702 may be generated so that the feature vector can then be compared or classified (e.g., using a linear function that assigns a score for each possible configuration), in one embodiment. Scores, or other configuration information, may be determined for each query model in embodiments implementing multiple query model(s). The resulting classifications may include a number of nodes, slots, containers, or other components for a computing resource (e.g., in a cluster) as well as the configuration of (e.g., settings enabled) for a query engine. For example, different query engines may provide many different kinds of configuration or optimization settings that can be enabled or disabled, in some embodiments. As part of applying the query model(s) 720, for instance, different configurations of a Presto framework may be determined (e.g., configurations that enable or disable features such as memory configuration properties, log file location properties, worker configuration properties, coordinator configuration properties, catalog properties, Java Virtual Machine (JVM) properties, optimizer properties, node scheduler properties, exchange properties, distributed joins, distributed index joins, redistributed writes, session properties, etc.).

Application of query model(s) 720 may classify or otherwise indicate a resource configuration (e.g., query engine configuration(s) 722 for each query model that satisfies the execution limitation 704. Execution limitations 702 may be time limitations (e.g., query execution time limits), cost-defined limitations (e.g., number of resource units or cost units consumed to execute the query, service level agreements (SLAs), performance models, cost models, or any other limitation that may be placed on the execution of the query (e.g. a limitation excluding certain query execution engines from consideration). In some embodiments, resource selection 730 may first select one query engine configuration to use (e.g., based on confidence scores or other values that indicate the strength of the classification of the query in the different query model(s) 720 that satisfies the execution limitation 704 if multiple query model(s) are used.

Resource selection 730 may obtain a set (e.g., a snapshot of) available resource(s) 734 for executing the query from resource manager service. Note that the available resource(s) 734 may be provided to query selection engine 730 prior to the receipt of query 702, in some embodiments. Query selection engine 730 may then compare the available resource(s) 734 with the query engine configuration(s) 722 to select the resource to execute the query. For example, resource selection 730 may compare the number nodes in a cluster to see if the number of nodes meets or exceeds the number of nodes identified in query engine configuration(s) 722, in one embodiment. Similarly, query selection engine 730 may compare the configuration(s) of the different resources, such as the engine type (e.g., Presto, Apache Spark, etc.) and the configuration of the engine (e.g., which properties are enabled or disabled on the engine). In some embodiments, resource selection may select a candidate list or set of query engines that meet or exceed the query engine configuration(s) 722. For example, if the query engine configuration 722 identifies a cluster of 10 nodes, then 5 clusters with 10 or greater nodes may be identified as a candidate list of resources. Resource selection 730 may then provide a selected resource 732 to query tracker 340 in order to execute the query. If the selected resource is no longer available (e.g., due to failure or having already been assigned a query in the time between indicated as available 734 and selected 732), then another resource from the candidate set may be selected 732 (or the candidate set may be provided to query tracker 340, in some embodiments, for retry until assignment).

In some embodiments, query concurrency patterns 744 may alter or modify the selection of resources. For instance, as noted above a same client, user, customer, or submitter may submit multiple queries which may be routed to the same resource so that the queries can be executed without recycling or scrubbing the resource (as the queries would not be executed on resources for which the submitter of the query had not right to access the data or results of the other queries executing at that resource). Query concurrency patterns 744 may indicate the likelihood that a same submitter will submit another query in addition to query 704, as well as the type of query the subsequent query may be, in some embodiments. In some embodiments, resource selection 730 may select a query engine that can include capacity to accommodate both the received query within the execution limitation 704 as well as the likely subsequent query (which may also have an execution limitation). In this way, resource selection 730 may still allow for queries to be co-located on resources executing queries from the same submitter.

In at least some embodiments, resource planner 330 may implement resource provisioning model 740. Resource provisioning model 740 may be a model that is generated from execution data 742 for previously executed queries to determine or recommend resources (including the configuration of the resources) for provisioning, in some embodiments. For example, resource provisioning model 740 may be generated from various unsupervised learning techniques, such as clustering analysis, dimensionality reduction, and other such techniques to determine which resource configurations (e.g., query engine types, query engine configurations, number of nodes, slots, or units) are likely to be utilized by queries (e.g., according to the techniques for selection resources at resource selection 730). For example, clustering analysis may be performed to identify that ninety percent of clusters have query engine type A, configuration settings B set, and have C number of nodes. Thus, resource provisioning model 746 may provide a recommendation 746 to provision more resources with query engine type A, configuration settings B set, and have C number of nodes. In some embodiments, resource provisioning model 740 may provide general provisioning recommendations according to a set of classifications (e.g., small clusters, medium clusters, larger clusters with engine type A, and configuration settings B set). In at least some embodiments, multiple resource provisioning models 740 may be implemented (e.g., to predict the demand of different types of query engines for different times when making provisioning recommendations).

Figure 8:
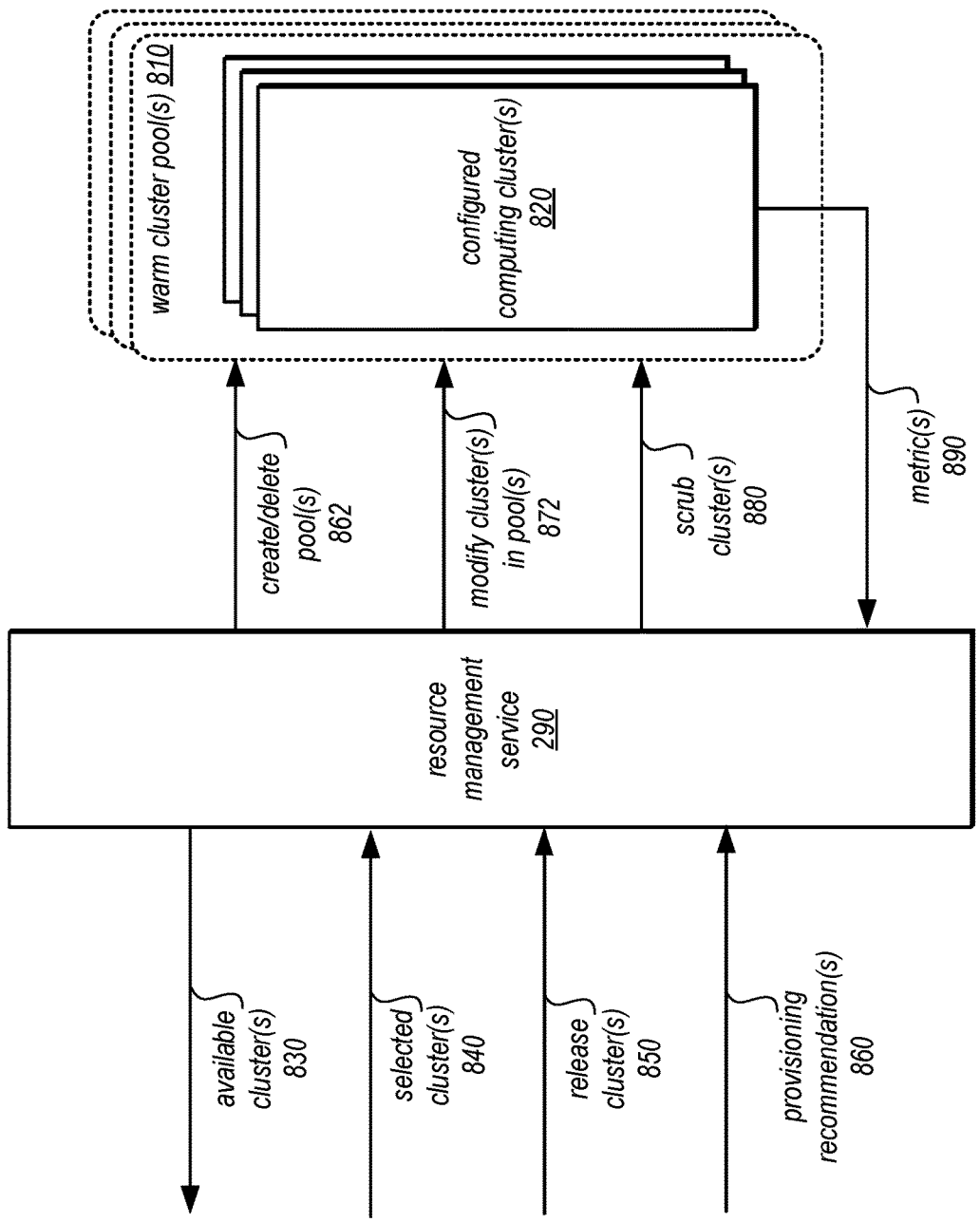
FIG. 8 is logical block diagram illustrating interactions between a resource management service and pools of resources, according to some embodiments.

FIG. 8 is logical block diagram illustrating interactions between a resource management service and pools of resources, according to some embodiments. Resource management service 290 may implement a programmatic interface (e.g., API) or other interface that allows other network-based services (or a client or a provider network) to submit requests for preconfigured resources from a resource pool managed by resource management service 290. For example, a request for available clusters 830 may be received (e.g., from resource planner 330) in order to provide a snapshot or other state of configured computing clusters 820 in warm cluster pools 810. As discussed above with regard to FIGS. 5 and 7, resource planner may then provide a selected cluster for the query tracker to use for a received query. Query tracker may send an indication that identifies the selected cluster 840 (e.g., by specifying a location, identifier, or other information for the identified computing resource) so that resource manager service 290 may remove the resource from the pool of available resource. For example, resource management service 290 may update state information for the cluster to indicate that the cluster is leased or otherwise unavailable. Resource management service 290 may also receive requests to release a cluster 850 from a current assignment (e.g., as the query execution at the cluster is complete). Resource management service 290 may then update state information (e.g., the lease) for the cluster and pool to return the cluster to the pool, in some embodiments.

As indicated at 862, resource management service 290 may automatically (or in response to requests (not illustrated)), commission or decommission pool(s) of clusters 810. For example in some embodiments, resource management service 290 may perform techniques that select the number and size of computing clusters 820 for the warm cluster pool 810. The number and size of the computing clusters 820 in the warm cluster pool 810 can be determined based upon a variety of factors including, but not limited to, historical and/or expected volumes of query requests, the price of the computing resources utilized to implement the computing clusters 820, and/or other factors or considerations, in some embodiments.

Once the number and size of computing clusters 820 has been determined, the computing clusters 820 may be instantiated, such as through the use of an on-demand computing service, or virtual compute service or data processing service as discussed above in FIG. 2. The instantiated computing clusters 820 can then be configured to process queries prior to receiving the queries at the managed query service. For example, and without limitation, one or more distributed query frameworks or other query processing engines can be installed on the computing nodes in each of the computing clusters 820. As discussed above, in one particular implementation, the distributed query framework may be the open source PRESTO distributed query framework. Other distributed query frameworks can be utilized in other configurations. Additionally, distributed processing frameworks or other query engines can also be installed on the host computers in each computing cluster 820. As discussed above, the distributed processing frameworks can be utilized in a similar fashion to the distributed query frameworks. For instance, in one particular configuration, the APACHE SPARK distributed processing framework can also, or alternately, be installed on the host computers in the computing clusters 820.

Instantiated and configured computing clusters 820 that are available for use by the managed query service 270 are added to the warm cluster pool 810, in some embodiments. A determination can be made as to whether the number or size of the computing clusters 820 in the warm cluster pool needs is to be adjusted, in various embodiments. The performance of the computing clusters 820 in the warm cluster pool 810 can be monitored based on metric(s) 890 received from the cluster pool. The number of computing clusters 820 assigned to the warm cluster pool 810 and the size of each computing cluster 820 (i.e. the number of host computers in each computing cluster 820) in the warm cluster pool 810 can then be adjusted. Such techniques can be repeatedly performed in order to continually optimize the number and size of the computing clusters 820 in the warm cluster pool 810. Configurations of clusters for a resource pool or a new pool may be provided as provisioning recommendations (as discussed above with regard to FIG. 7), which may indicate the configuration of a cluster (e.g. query engine type, query engine configuration settings, As indicated at 880, in some embodiments, resource management service 270 may scrub clusters(s) 880, (e.g., as a result of the lease state transitioning to expired or terminated) by causing the cluster to perform operations (e.g., a reboot, disk wipe, memory purge/dump, etc.) so that the cluster no longer retains client data and is ready to process another query. For example, resource management service 290 may determine whether a computing cluster 820 is inactive (e.g. the computing cluster 820 has not received a query in a predetermined amount of time). If resource management service 290 determines that the computing cluster 820 is inactive, then the computing cluster 820 may be disassociated from the submitter of the query. The computing cluster 820 may then be "scrubbed," such as by removing data associated with the submitter of the queries from memory (e.g. main memory or a cache) or mass storage device (e.g. disk or solid state storage device) utilized by the host computers in the computing cluster 820. The computing cluster 820 may then be returned to the warm cluster pool 810 for use in processing other queries. In some embodiments, some clusters that are inactive might not be disassociated from certain users in certain scenarios. In these scenarios, the user may have a dedicated warm pool of clusters 810 available for their use.

As indicated at 860, in some embodiments, resource management service 290 may receive requests to configure resources or a pool of resources. For example, a request to configure a pool of resources may identify a type or size of cluster, a processing engine, machine image, or software to execute for individual clusters in the pool. In some embodiments, the request may indicate a maximum number of resources in the pool, a minimum number of idle resources in the pool, and a maximum number of idle resources in the pool. As indicated at 870, resource management service may receive a request to configure or specify a pool modification event for a pool, in some embodiments. For example, the pool modification event may be defined according to one or more criteria, such as the minimum number of idle resources, maximum number of idle resources, average job execution time thresholds, pool or resource lifecycle/state conditions, or any other set of one or more criteria that may be evaluated to detect a pool modification event.

Figure 9:
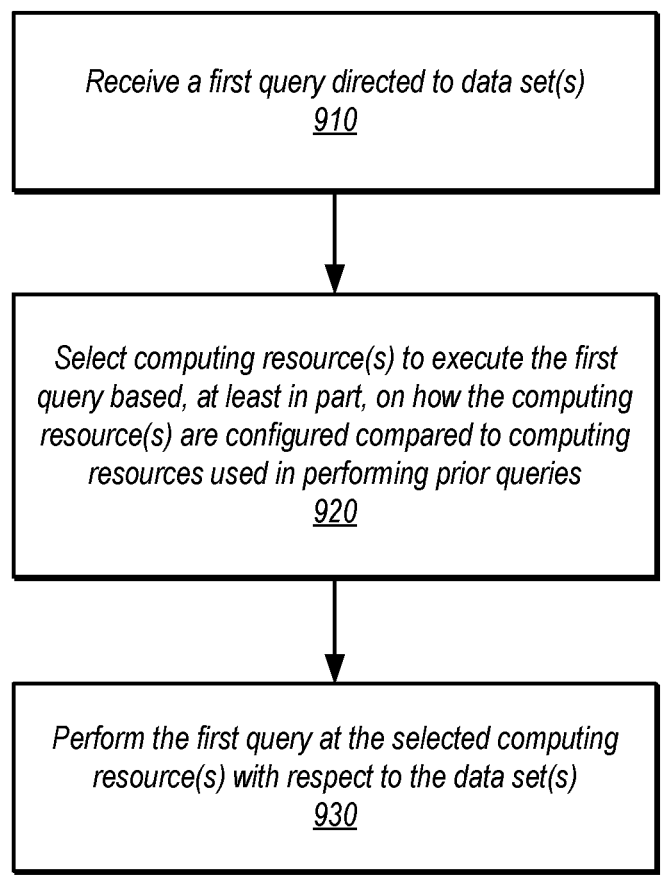
FIG. 9 is a high-level flowchart illustrating various methods and techniques to implement selecting resource configurations for query execution, according to some embodiments.

Although FIGS. 2-8 have been described and illustrated in the context of a provider network leveraging multiple different services to implement resource management service to select resource configurations for query execution, the various components illustrated and described in FIGS. 2-8 may be easily applied to other systems, or devices that manage or select resources for query execution from pools of configured resources. As such, FIGS. 2-8 are not intended to be limiting as to other embodiments of a system that may implement stateful management of resource pools for executing jobs. FIG. 9 is a high-level flowchart illustrating various methods and techniques to implement selecting resource configurations for query execution, according to some embodiments. Various different systems and devices may implement the various methods and techniques described below, either singly or working together. For example, a resource management service as described above with regard to FIGS. 2-8 may implement the various methods. Alternatively, a combination of different systems and devices may implement these methods. Therefore, the above examples and any other systems or devices referenced as performing the illustrated method, are not intended to be limiting as to other different components, modules, systems, or configurations of systems and devices.

As indicated at 910, a first query directed to data set(s) may be received, in various embodiments. The first query may be received that is directed to data set(s) separately stored in remote data stores, in various embodiments. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments.

As indicated at 920, computing resource(s) may be selected to execute the first query based, at least in part, on how the computing resource(s) are configured compared to computing resources used in performing prior queries, in some embodiments. For example, a historical query model (e.g., such as a model generated according to machine learning techniques) may be maintained that models the performance of queries with different characteristics based on different execution outcomes (e.g., time to complete, cost to complete, resources consumed to complete, probability of failure or timeout, etc.). The historical query model may then be applied, in some embodiments to the query, by comparing features of the query with respect to the features of queries identified in the model, as discussed in detail below with regard to FIG. 11. In some embodiments, a best performance outcome (e.g., a best effort model or service level agreement) may be a default feature that determines the selection of computing resources. In other embodiments, a best cost outcome (e.g., a lowest cost model or limitation) may be a default features that determines the selection of the computing resources. In some embodiments, a client that submits the query can include in the query a hint or other indicator identifying the performance outcome or limitation desired for processing of the query.

As indicated at 930, the first query may be performed at the selected computing resource(s) with respect to the data set(s), in various embodiments. For example, the resource request may be routed to the selected resource in some embodiments. A request to initiate or being processing at the selected computing resource(s) may be performed, in some embodiments, according to an API request or the first query may be initiated by transmitting the query in its original format to the computing resources for execution.

Figure 10:
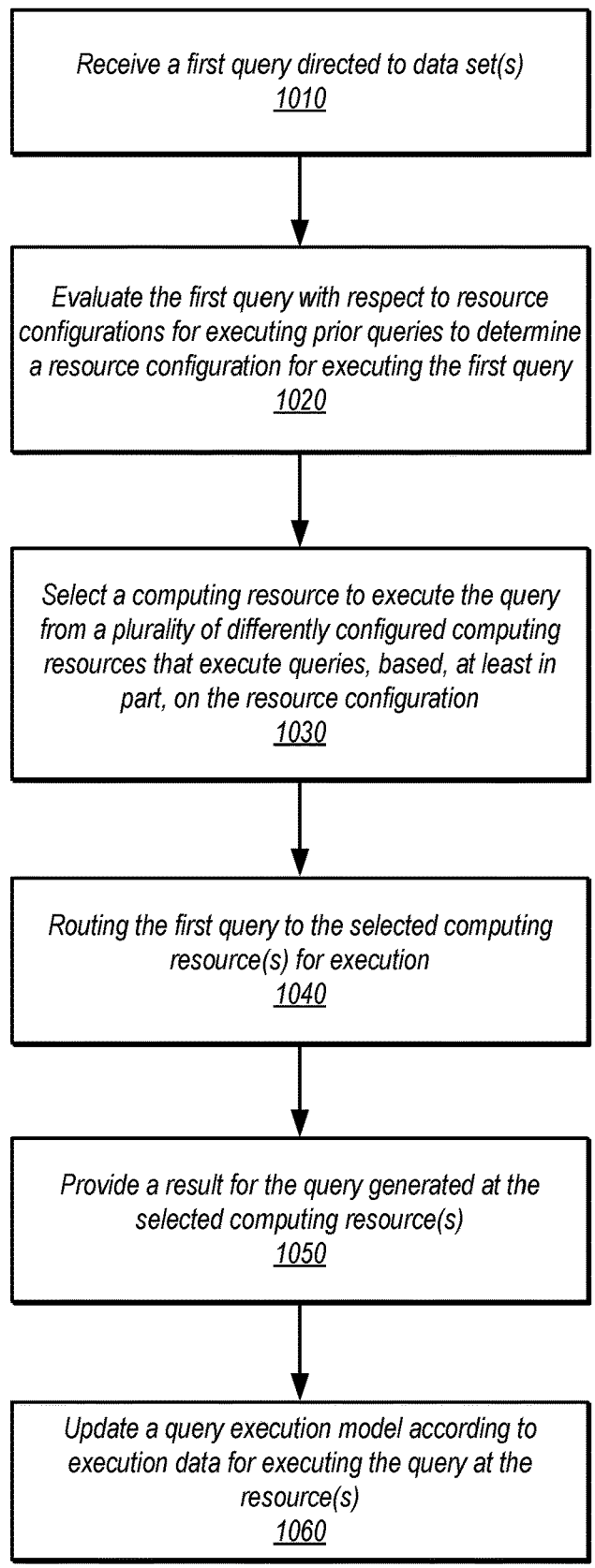
FIG. 10 is a high-level flowchart illustrating various methods and techniques to implement routing queries to selected computing resources, according to some embodiments.

FIG. 10 is a high-level flowchart illustrating various methods and techniques to implement routing queries to selected computing resources, according to some embodiments. As indicated at 1010, a first query may be received that is directed to data set(s), in various embodiments. The first query may be received that is directed to data set(s) separately stored in remote data stores, in various embodiments. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments.

As indicated at 1020, the first query may be evaluated with respect to resource configurations for executing the first query, in some embodiments. For example, a determination may be made as to whether the first query is the same or similar to prior query (e.g., by comparing query language or data sources). If so, then the resource configuration(s) of the same or prior queries may be evaluated according to a desired performance outcome or limitation (as discussed above). If no similar queries can be found, then a default computing resource configuration may be selected or further types of similarity analysis or classification may be performed (e.g., using a historical query model as discussed above and below). As indicated at 1030, a computing resource may be selected to execute the query from a plurality of differently configured computing resources that execute queries, based at least in part, on the resource configuration, in some embodiments. The plurality of computing resources may be pre-configured according to query engines of different types, different configuration settings, and/or different sizes (e.g., number of nodes or slots in a cluster). The determined resource configuration may be compared with the configured computing resources to determine a best match or other similarity score for the determine resource configurations and the configuration of resources. In some embodiments, selection of a computing resource may include selection of a pool of resources (of a same configuration), so that the actual resource selected is determined from the pool.

As indicated at 1040, the first query may be routed to the selected computing resource(s) for execution, in some embodiments. As indicated at 1050, a result for the query generated at the selected computing resource(s) may be provided, in some embodiments. For example, the results can be sent to a destination or location specified for the query results (e.g., in a client request), in one embodiment. The results may be streamed back or aggregated (e.g., in a data store, like data storage service 230) and provided as a batch (or batches, such as paginated results) via a same interface (e.g., programmatic, graphical, driver, console, etc.) that received the query.

As indicated at 1060, a query execution model according to execution data for executing the query at the resources, in some embodiments. For example, the memory consumed, processing capacity consumed, number of slots, nodes, or other execution units consumed/utilized, execution plans for prior queries (e.g., including the various types of operations selected by the plan to perform the prior queries), the total execution time to perform the query, a resource or determined cost (e.g., in terms of work or cost units, such as IOPS or monetary units), failure or success indications, and/or failure types (e.g., including error codes or exceptions generated) may be included as part of execution data. A supervised learning technique may take the execution data as part of the training set, mapping the performance or results of the query's execution to the features of the query (e.g., query execution plan, source data sets, etc.) in order to train the query execution model to achieve a similar outcome for the query if a similar query is received.

Figure 11:
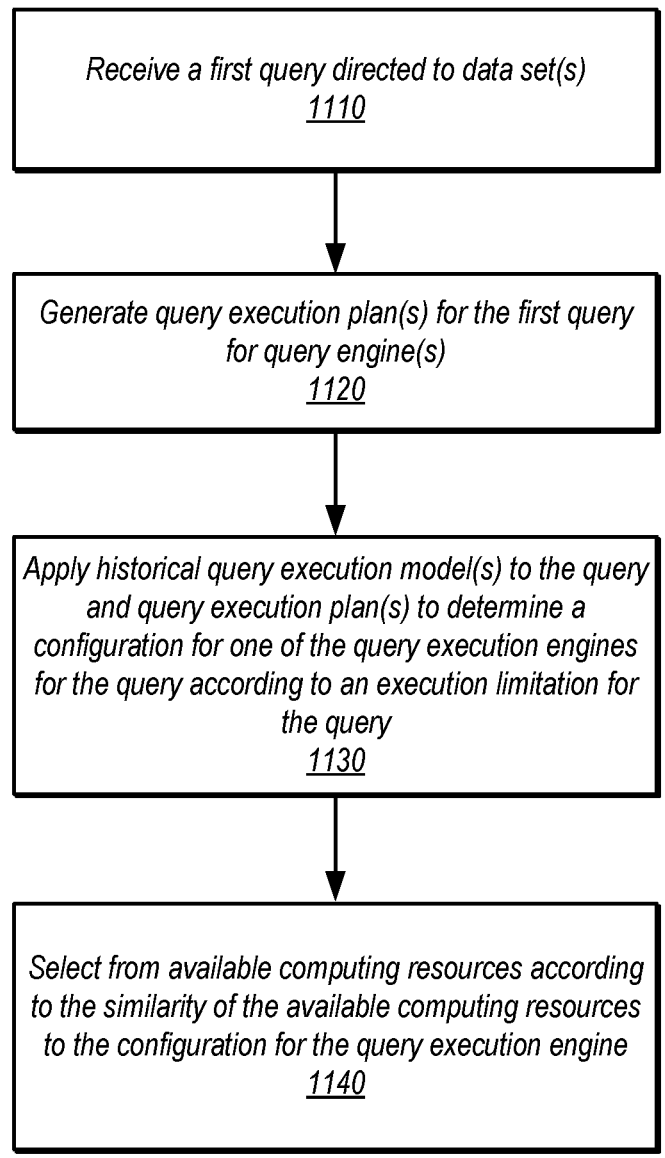
FIG. 11 is a high-level flowchart illustrating various methods and techniques to apply a query execution model to select a resource configuration, according to some embodiments.

FIG. 11 is a high-level flowchart illustrating various methods and techniques to apply a query execution model to select a resource configuration, according to some embodiments. As indicated at 1110, a first query directed to data set(s) may be received. The first query may be received that is directed to data set(s) separately stored in remote data stores, in various embodiments. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments.

As indicated at 1120, query execution plan(s) for the first query for query engine(s) may be generated, in some embodiments. For example, query plan generation techniques that parse a SQL query, identify the SQL operations, and data identified in the query, determine the operations to perform in order to accomplish the query, and assemble the operations in multiple candidate execution plans (e.g., based on table statistics or other metadata for queried data sets) may be performed. Then the candidate execution plan based on a lowest cost to execute the plan may be selected so that optimized query execution plans are generated for the query, in some embodiments. If multiple query engines may be considered to execute the query, then multiple query execution plans may be generated, in some embodiments, one for each type of query engine.

As indicated at 1130, historical query execution model(s) may be applied to the first query and the query execution plan(s) for one of the query execution(s) for the query according to an execution limitation for the query, in some embodiments. For example, feature vectors or other representations of the query and query plan(s) may be generated in order to analyze the received query with respect to the historical query model. A classification or regression function determined from the historical query execution model(s) may be applied, in some embodiments to generate similarity scores between a query and different classes of queries that may be described in the historical query execution model (e.g., short-running, long-running, compute intensive, memory intensive, DDL query, or DML query). The execution limitation may be applied to determine which classifications do (or do not) satisfy the execution limitation (e.g., a time limit for performing the query or cost limit for performing the query), in some embodiments. Alternatively, different classifications may be mapped to different execution limitations (e.g., classification A satisfies limit A, classification B satisfies limit B, etc.).

As indicated at 1140, a computing resource may be selected from available computing resources according to the similarity of the available computing resources to the determined configuration. For example, a set (e.g., a snapshot of) available computing resources for executing the query may be obtained (e.g., by examining availability data, resource pool data, pinging resources to see if they are available, or by requesting the set of available computing resources from a service like resource management service 290 in FIG. 2 above). The determined resource configuration may be then be compared with the available computing resources. For example, the number nodes in a cluster resource may be evaluated to see if the number of nodes meets or exceeds the number of nodes identified in the resource configuration, in one embodiment, or whether the type of query engine matches the specified type of query engine in the resource configuration. In some embodiments, configuration settings for the computing resource (e.g., for the query engine) may be specified as part of the resource configuration.

Figure 12:
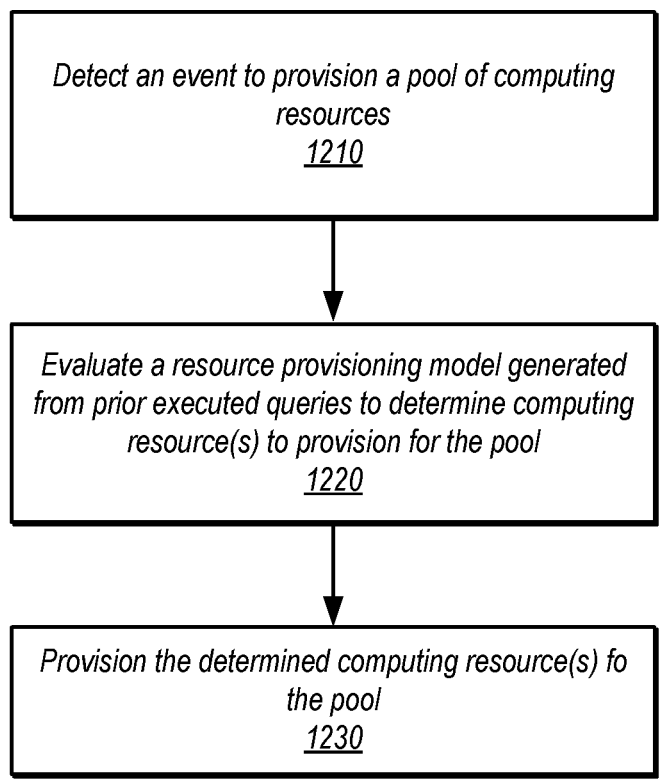
FIG. 12 is a high-level flowchart illustrating various methods and techniques to determine resource provisioning recommendations according to the execution of prior queries, according to some embodiments.

FIG. 12 is a high-level flowchart illustrating various methods and techniques to determine resource provisioning recommendations according to the execution of prior queries, according to some embodiments. As indicated at 1210, an event may be detected to provision a pool of computing resources, in various embodiments. For example, provisioning events may be triggered based on the time of day, day of the week, month, or year, or any other time-related data, workload or demand upon computing resources in existing pools, projected workload or demand for resource pools, or in response to a request (e.g., from a system administrator or a network-based service, such as managed query service 270) to provision a resource pool.

If a provisioning event is detected, then a resource provisioning model generated from prior executed queries to determine computing resource(s) to provision may be evaluated, as indicated at 1230, in various embodiments. For example, the resource provisioning model may be evaluated with respect to one type of resource configuration criteria (e.g., number of nodes in a cluster) in order to determine other resource configuration criteria (e.g., engine type and/or engine configuration settings). Other variables such as the time of day, overall state of resource pool(s), or other information that may alter a provisioning recommendation (e.g., including excluding some resource(s) from configuration) may be used to evaluate the resource provisioning model. In some embodiments, resources to be provisioned may be determined according to general classifications, such as small, medium, or large clusters, or may be determined with a specific number of nodes, engine type and engine configuration settings. In some embodiments, a time-based analysis of the execution of prior queries and resource configurations may be performed (e.g., examining demand and resource configuration as a time series) to predict the demand, and thus number and configuration of resources to include the pool based on a time or time period associated with the provisioning event. For instance, a provisioning event to launch a resource pool at 6:00 PM EST may evaluate the demand for resources starting at 6:00 PM EST, as well as the configuration of the resources used to execute the queries received in order to provision a number of resources that can satisfy a predicted demand for the pool starting at 6:00 PM EST.

The determined resource(s) may then be provisioned, as indicated at 1230, in some embodiments. For example, requests to other network-based systems or services to launch, create, instantiate, or configure new resources according to the configuration of the determined computing resources.

In some embodiments, pools of computing resource(s) configured for query execution may be monitored, in various embodiments, to provisioning individual resources within a pool of computing resources. For example, as resources are leased, assigned, or otherwise allocated to execute queries, the number of available resources in the pool may decrease. Similarly, resource failures or resource expirations may reduce the number of available resources. If, for example, the number of available resources falls below a maintenance threshold, then a provisioning event may be detected for an existing pool. Similar techniques to those described above may be performed to provide a recommendation as to the number and/or configuration of resources to provision for the existing pool.

The methods described herein may in various embodiments be implemented by any combination of hardware and software. For example, in one embodiment, the methods may be implemented by a computer system (e.g., a computer system as in FIG. 15) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 13:
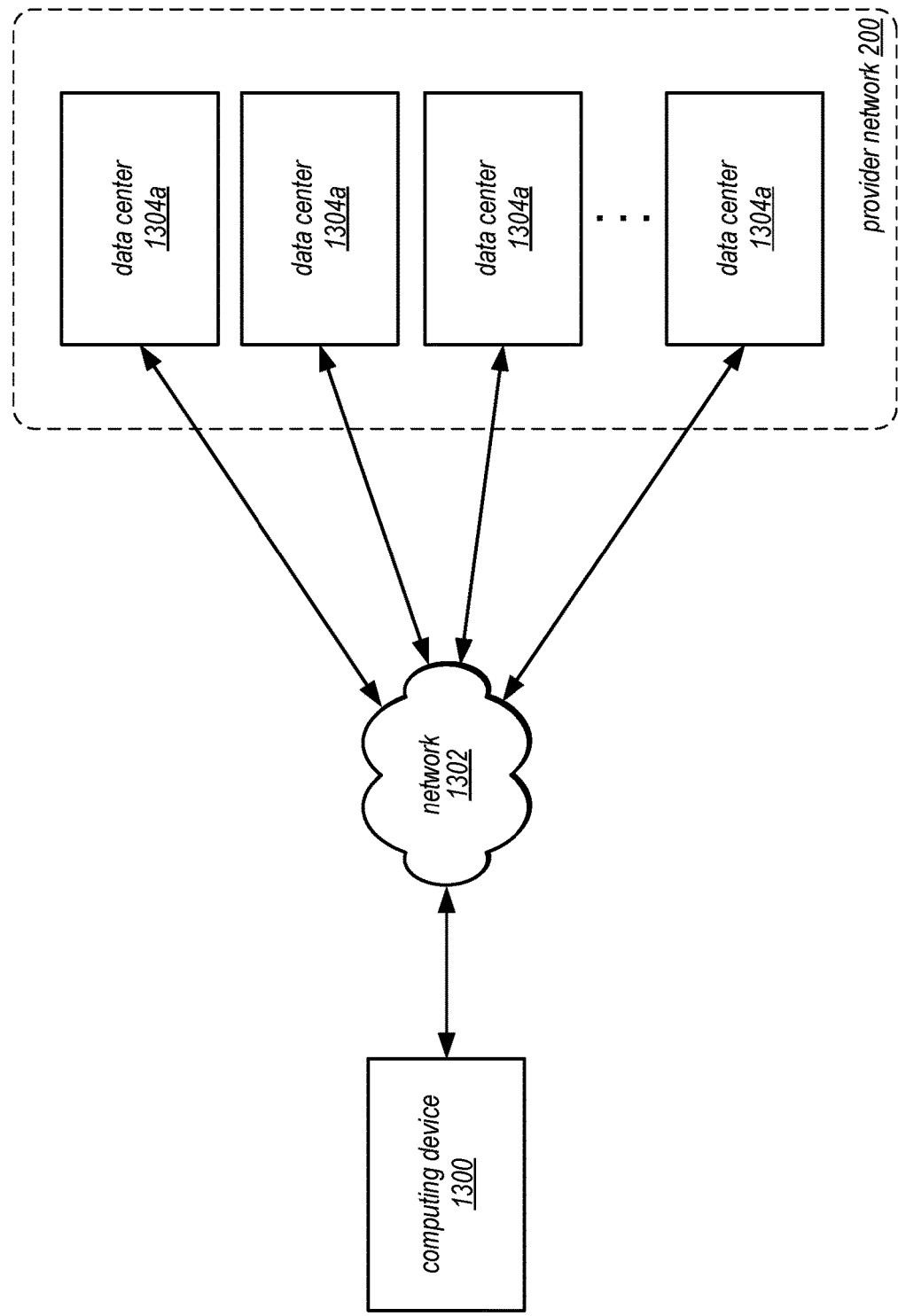
FIG. 13 is a logical block diagram that shows an illustrative operating environment that includes a service provider network that can be configured to implement aspects of the functionality described herein, according to some embodiments.

FIG. 13 is a logical block diagram that shows an illustrative operating environment that includes a service provider network that can implement aspects of the functionality described herein, according to some embodiments. As discussed above, the service provider network 200 can provide computing resources, like VM instances and storage, on a permanent or an as-needed basis. Among other types of functionality, the computing resources provided by the service provider network 200 can be utilized to implement the various services described above. As also discussed above, the computing resources provided by the service provider network 200 can include various types of computing resources, such as data processing resources like VM instances, data storage resources, networking resources, data communication resources, network services, and the like.

Each type of computing resource provided by the service provider network 200 can be general-purpose or can be available in a number of specific configurations. For example, data processing resources can be available as physical computers or VM instances in a number of different configurations. The VM instances can execute applications, including web servers, application servers, media servers, database servers, some or all of the services described above, and/or other types of programs. The VM instances can also be configured into computing clusters in the manner described above. Data storage resources can include file storage devices, block storage devices, and the like. The service provider network 200 can also provide other types of computing resources not mentioned specifically herein.

The computing resources provided by the service provider network maybe implemented, in some embodiments, by one or more data centers 1304A-1304N (which might be referred to herein singularly as "a data center 1304" or in the plural as "the data centers 1304"). The data centers 1304 are facilities utilized to house and operate computer systems and associated components. The data centers 1304 typically include redundant and backup power, communications, cooling, and security systems. The data centers 1304 can also be located in geographically disparate locations. One illustrative configuration for a data center 1304 that can be utilized to implement the technologies disclosed herein will be described below with regard to FIG. 14.

The customers and other users of the service provider network 200 can access the computing resources provided by the service provider network 200 over a network 1302, which can be a wide area communication network ("WAN"), such as the Internet, an intranet or an Internet service provider ("ISP") network or a combination of such networks. For example, and without limitation, a computing device 1300 operated by a customer or other user of the service provider network 200 can be utilized to access the service provider network 200 by way of the network 1302. It should be appreciated that a local-area network ("LAN"), the Internet, or any other networking topology known in the art that connects the data centers 1304 to remote customers and other users can be utilized. It should also be appreciated that combinations of such networks can also be utilized.

Figure 14:
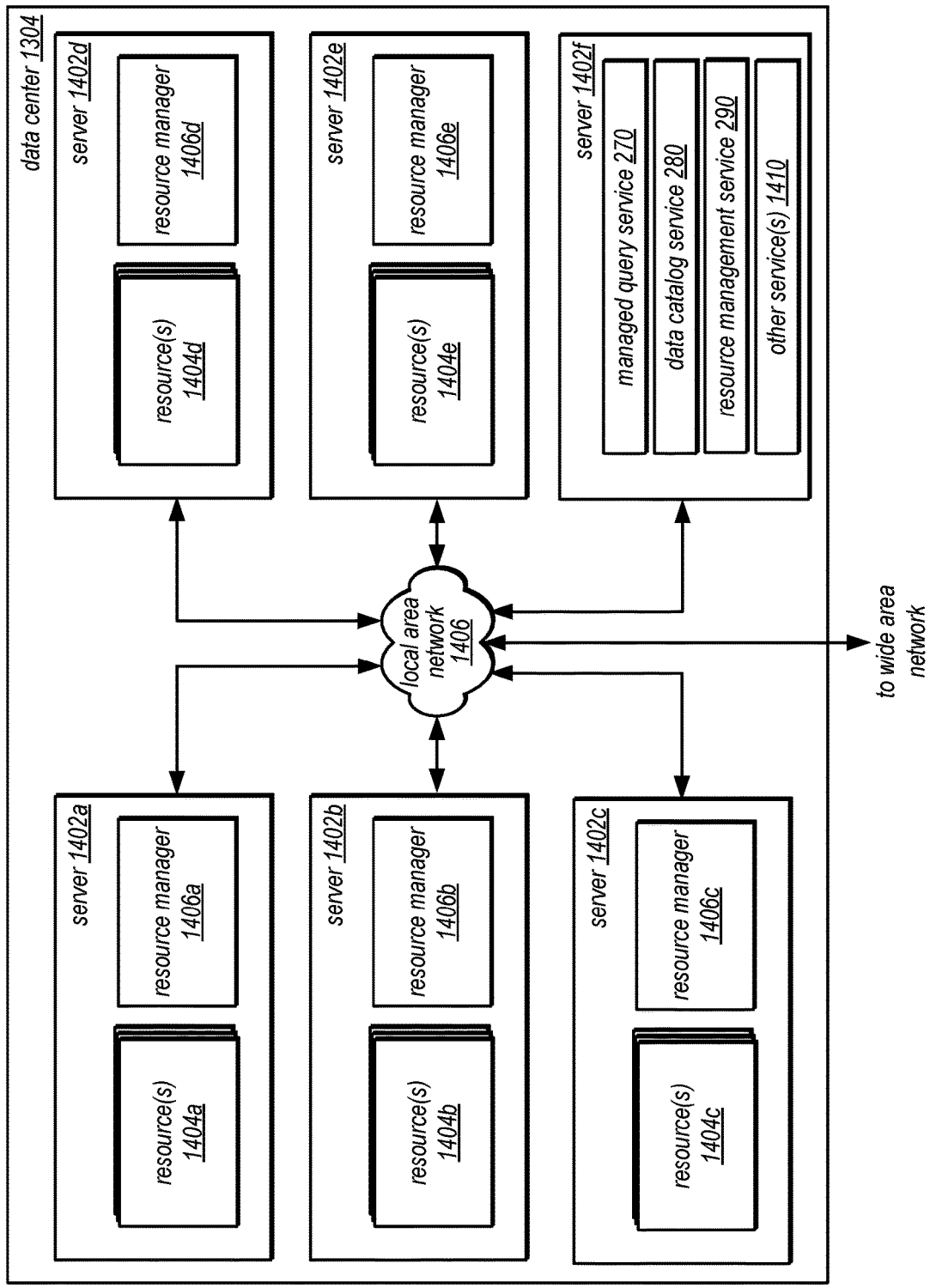
FIG. 14 is a logical block diagram illustrating a configuration for a data center that can be utilized to implement aspects of the technologies disclosed herein, according to some embodiments.

FIG. 14 is a logical block diagram illustrating a configuration for a data center that can be utilized to implement aspects of the technologies disclosed herein, according to various embodiments. is a computing system diagram that illustrates one configuration for a data center 1304 that implements aspects of the technologies disclosed herein for providing managed query execution, such as managed query execution service 270, in some embodiments. The example data center 1304 shown in FIG. 14 includes several server computers 1402A-1402F (which might be referred to herein singularly as "a server computer 1402" or in the plural as "the server computers 1402") for providing computing resources 1404A-1404E.

The server computers 1402 can be standard tower, rackmount, or blade server computers configured appropriately for providing the computing resources described herein (illustrated in FIG. 14 as the computing resources 1404A-1404E). As mentioned above, the computing resources provided by the provider network 200 can be data processing resources such as VM instances or hardware computing systems, computing clusters, data storage resources, database resources, networking resources, and others. Some of the servers 1402 can also execute a resource manager 1406 capable of instantiating and/or managing the computing resources. In the case of VM instances, for example, the resource manager 1406 can be a hypervisor or another type of program may enable the execution of multiple VM instances on a single server computer 1402. Server computers 1402 in the data center 1304 can also provide network services and other types of services, some of which are described in detail above with regard to FIG. 2.

The data center 1304 shown in FIG. 14 also includes a server computer 1402F that can execute some or all of the software components described above. For example, and without limitation, the server computer 1402F can execute various components for providing different services of a provider network 200, such as the managed query service 270, the data catalog service 280, resource management service 290, and other services 1410 (e.g., discussed above) and/or the other software components described above. The server computer 1402F can also execute other components and/or to store data for providing some or all of the functionality described herein. In this regard, it should be appreciated that the services illustrated in FIG. 14 as executing on the server computer 1402F can execute on many other physical or virtual servers in the data centers 1304 in various configurations.

In the example data center 1304 shown in FIG. 14, an appropriate LAN 1406 is also utilized to interconnect the server computers 1402A-1402F. The LAN 1406 is also connected to the network 1302 illustrated in FIG. 13. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1304A-1304N, between each of the server computers 1402A-1402F in each data center 1304, and, potentially, between computing resources in each of the data centers 1304. It should be appreciated that the configuration of the data center 1304 described with reference to FIG. 14 is merely illustrative and that other implementations can be utilized.

Figure 15:
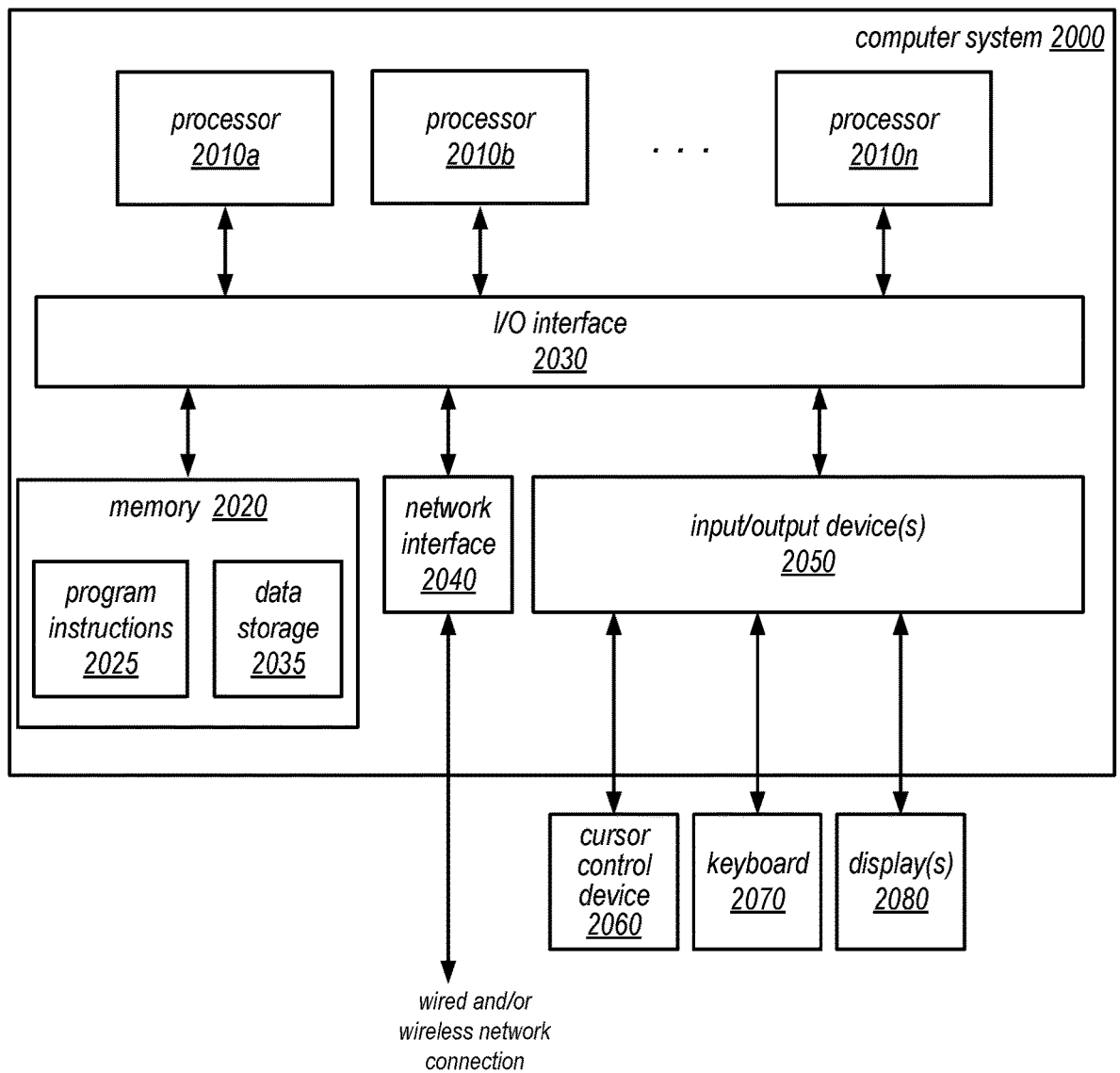
FIG. 15 illustrates an example system configured to implement the various methods, techniques, and systems described herein, according to some embodiments.

Embodiments of a managed query execution as described herein may be executed on one or more computer systems, which may interact with various other devices. One such computer system is illustrated by FIG. 15. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 15, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of computing nodes, respectively implementing a processor and a memory, configured to implement a managed query service, the managed query service configured to:
generate a resource provisioning model for the managed query service that utilizes resources obtained from resource pools with differently configured resources to perform queries, wherein the resource provisioning model is generated from a history of resource configurations that executed prior queries;
detect a provisioning event for the managed query service;
evaluate the resource provisioning model to determine one or more resources to provision for the managed query service according to the provisioning event; and
provision the determined one or more resources for a resource pool for the managed query service.

2. The system of claim 1, wherein to evaluate the resource provisioning model to determine one or more resources to provision for the managed query service according to the provisioning event, the managed query service is configured to evaluate the provisioning model with respect to one type of resource configuration criteria to determine another one or more resource configuration criteria for the one or more resources to provision.

3. The system of claim 1, wherein the provisioning event is triggered based, at least in part, on a demand upon the resource pools for the managed query service.

4. The system of claim 1, wherein the provisioning event is associated with a time, and wherein to evaluate the resource provisioning model to determine one or more resources to provision for the managed query service according to the provisioning event, the managed query service is configured to predict a demand for the managed query service at the time associated with the provisioning event.

5. The system of claim 1, wherein the resource pool is a new resource pool added as part of provisioning the determined one or more resources.

6. The system of claim 1, wherein provisioning the determined one or more resources for the resource pool adds the one or more resources to an existing resource pool of the managed query service.

7. The system of claim 1, wherein the managed query service is implemented as part of a provider network that offers a plurality of services and wherein to provision the determined one or more resources for the resource pool for the managed query service, the managed query service is configured to send requests to one or more of the plurality of services to obtain the one or more resources.

8. A method, comprising:
generating a resource provisioning model for a managed query service that utilizes resources obtained from resource pools with differently configured resources to perform queries, wherein the resource provisioning model is generated from a history of resource configurations that executed prior queries;
detecting a provisioning event for the managed query service;
evaluating the resource provisioning model to determine one or more resources to provision for the managed query service according to the provisioning event; and
provisioning the determined one or more resources for a resource pool for the managed query service.

9. The method of claim 8, wherein evaluating the resource provisioning model to determine one or more resources to provision for the managed query service according to the provisioning event comprises evaluating the provisioning model with respect to one type of resource configuration criteria to determine another one or more resource configuration criteria for the one or more resources to provision.

10. The method of claim 8, wherein the provisioning event is triggered based, at least in part, on a demand upon the resource pools for the managed query service.

11. The method of claim 8, wherein the provisioning event is associated with a time, and wherein evaluating the resource provisioning model to determine one or more resources to provision for the managed query service according to the provisioning event comprises predicting a demand for the managed query service at the time associated with the provisioning event.

12. The method of claim 8, wherein the resource pool is a new resource pool added as part of provisioning the determined one or more resources.

13. The method of claim 8, wherein provisioning the determined one or more resources for the resource pool adds the one or more resources to an existing resource pool of the managed query service.

14. The method of claim 8, wherein the managed query service is implemented as part of a provider network that offers a plurality of services and wherein provisioning the determined one or more resources for the resource pool for the managed query service comprises sending requests to one or more of the plurality of services to obtain the one or more resources.

15. One or more non-transitory, computer-readable storage media, storing program instructions that when executed on or across one or more computing devices cause the one or more computing devices to implement:

generating a resource provisioning model for a managed query service that utilizes resources obtained from resource pools with differently configured resources to perform queries, wherein the resource provisioning model is generated from a history of resource configurations that executed prior queries;

detecting a provisioning event for the managed query service;

evaluating the resource provisioning model to determine one or more resources to provision for the managed query service according to the provisioning event; and provisioning the determined one or more resources for a resource pool for the managed query service.

16. The one or more non-transitory, computer-readable storage media of claim 15, wherein, in evaluating the resource provisioning model to determine one or more resources to provision for the managed query service according to the provisioning event, the program instructions when executed on or across the one or more computing devices cause the one or more computing devices to implement evaluating the provisioning model with respect to one type of resource configuration criteria to determine another one or more resource configuration criteria for the one or more resources to provision.

17. The one or more non-transitory, computer-readable storage media of claim 15, wherein the provisioning event is triggered based, at least in part, on a demand upon the resource pools for the managed query service.

18. The one or more non-transitory, computer-readable storage media of claim 15, wherein the provisioning event is associated with a time, and wherein, in evaluating the resource provisioning model to determine one or more resources to provision for the managed query service according to the provisioning event, the program instructions when executed on or across the one or more computing devices cause the one or more computing devices to implement predicting a demand for the managed query service at the time associated with the provisioning event.

19. The one or more non-transitory, computer-readable storage media of claim 15, wherein the resource pool is a new resource pool added as part of provisioning the determined one or more resources.

20. The one or more non-transitory, computer-readable storage media of claim 15, wherein provisioning the determined one or more resources for the resource pool adds the one or more resources to an existing resource pool of the managed query service.

* * * * *